US011036401B2

(12) United States Patent
Caswell et al.

(10) Patent No.: US 11,036,401 B2
(45) Date of Patent: Jun. 15, 2021

(54) METHOD, APPARATUS, AND SYSTEM FOR CONTROLLING USER ACCESS TO A DATA STORAGE SYSTEM

(71) Applicant: Hitachi Vantara LLC, Santa Clara, CA (US)

(72) Inventors: Paul Clive Caswell, Bracknell (GB); Simon James Chappell, Bracknell (GB); Fabrice Claude Oliver Helliker, Bracknell (GB)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 16/488,957

(22) PCT Filed: Jul. 14, 2017

(86) PCT No.: PCT/US2017/042120
§ 371 (c)(1),
(2) Date: Aug. 27, 2019

(87) PCT Pub. No.: WO2019/013818
PCT Pub. Date: Jan. 17, 2019

(65) Prior Publication Data
US 2020/0004442 A1 Jan. 2, 2020

(51) Int. Cl.
*G06F 3/06* (2006.01)
(52) U.S. Cl.
CPC .......... *G06F 3/0622* (2013.01); *G06F 3/067* (2013.01); *G06F 3/0619* (2013.01); *G06F 3/0653* (2013.01); *G06F 3/0659* (2013.01)

(58) Field of Classification Search
CPC .... G06F 3/0622; G06F 3/0619; G06F 3/0653; G06F 3/0659; G06F 3/067
See application file for complete search history.

(56) References Cited

U.S. PATENT DOCUMENTS 7,730,523 B1   6/2010 Masurkar
8,935,751 B1 * 1/2015 Cardente ................. G06F 16/10
                                                      726/4

(Continued)

OTHER PUBLICATIONS

International Search Report of PCT/US2017/042120 dated Sep. 28, 2017.

(Continued)

*Primary Examiner* — Eric Cardwell
(74) *Attorney, Agent, or Firm* — Mattingly & Malur, PC

(57) ABSTRACT

User access to a data storage system including one or more nodes providing a plurality of data storage resources is controlled, the plurality of data storage resources storing one or more user-accessible primary data structures and one or more user-accessible secondary data structures, each secondary data structures being stored on the basis of a respective associated primary data structure, wherein the data storage system stores, for each secondary data structure, data structure metadata which is indicative of a parent data storage resource and an owner data storage resource of the respective secondary data structure. Upon receiving a user request to access a certain secondary data structure of the one or more secondary data structures stored on a respective parent data storage resource, based on data structure metadata stored for the certain secondary data structure, the respective owner data storage resource of the certain secondary data structure is determined.

14 Claims, 12 Drawing Sheets

(56) References Cited

U.S. PATENT DOCUMENTS

| | | | |
|---|---|---|---|
| 2007/0198802 A1* | 8/2007 | Kavuri | G06F 3/0683 |
| | | | 711/170 |
| 2008/0022370 A1 | 1/2008 | Beedubail et al. | |
| 2008/0120302 A1 | 5/2008 | Thompson et al. | |
| 2014/0380407 A1 | 12/2014 | Nyman | |
| 2015/0261768 A1 | 9/2015 | Ahn et al. | |
| 2015/0294377 A1* | 10/2015 | Chow | G06Q 30/0282 |
| | | | 705/347 |
| 2017/0063946 A1* | 3/2017 | Quan | H04L 67/20 |
| 2018/0253261 A1* | 9/2018 | Kripalani | G06F 3/0604 |

OTHER PUBLICATIONS

Extended European Search Report received in corresponding European Application No. 17917316.6 dated Jan. 26, 2021.

* cited by examiner

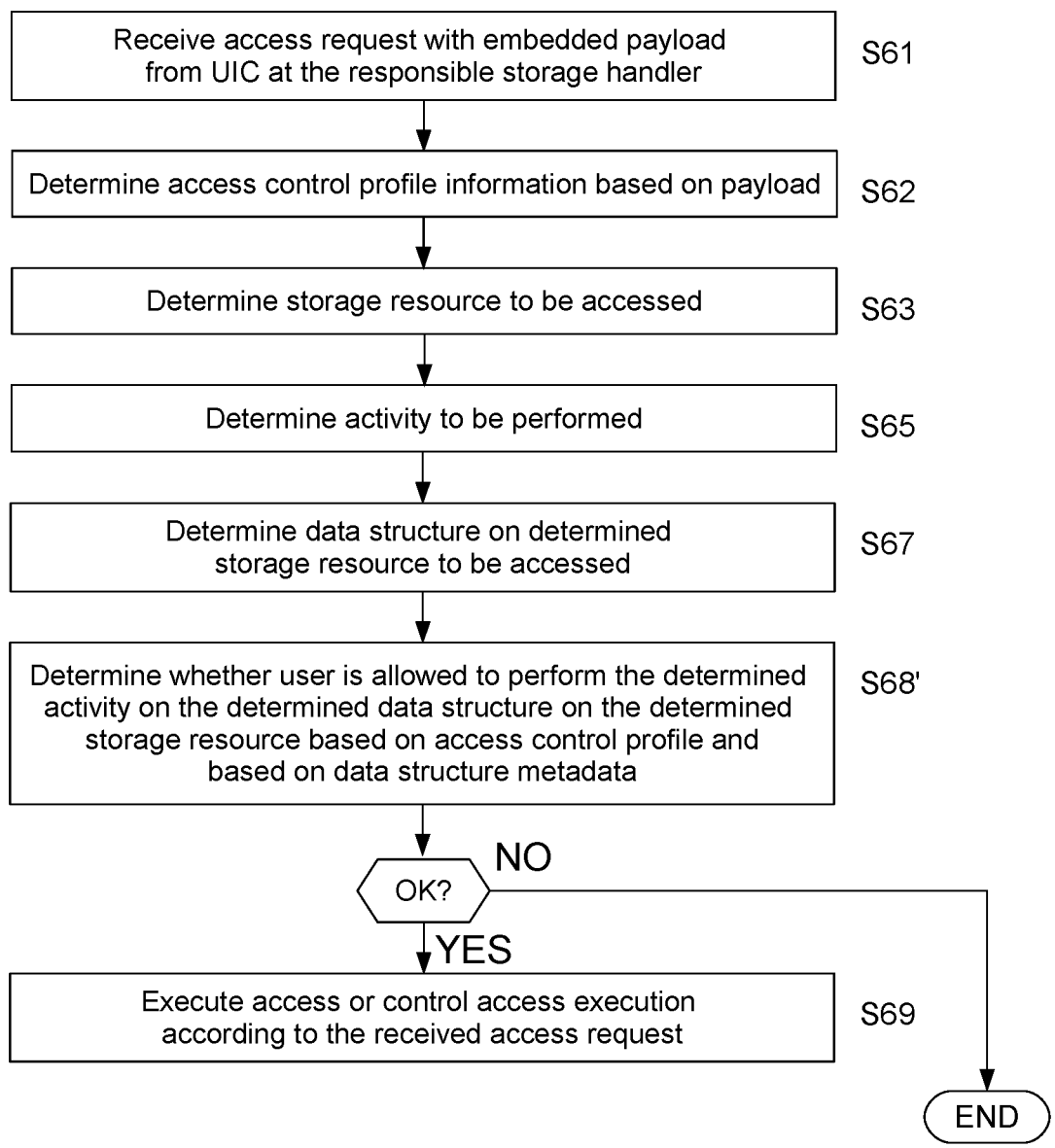

METHOD, APPARATUS, AND SYSTEM FOR CONTROLLING USER ACCESS TO A DATA STORAGE SYSTEM

The present disclosure relates to methods, apparatuses, and systems for controlling user access to a data storage system, which includes one or more nodes providing a plurality of data storage resources, in particular on the basis of role based access control (RBAC).

BACKGROUND

Backup systems for computers are well known. Backup systems provide for the redundant storage of data, so that a computer can be restored to a previous state after an event that results in the loss of data on the computer. As those skilled in the art will appreciate, data stored on a computer can be very valuable and the loss of data can result in severe economic hardship.

Banks, stock brokerages, and other companies commonly store large amounts of data on computers. This data is vital to the day-to-day operations of such businesses. For example, it is easy to appreciate that a bank's account records, which are commonly stored in a computer, are necessary in order to facilitate the regular business transactions of the bank.

Events such as fires, earthquakes, thefts, and hard disk failures may result in the loss of valuable computer data. If the only copy of a company's data is stored on the affected computer, then the loss may be permanent and may have catastrophic consequences.

However, if the data was previously backed up, then the data may be restored, so that the routine operations of the business may continue with a minimum of disruption. Thus, the backing up of data stored on computers is considered necessary and has generally become routine.

Backup systems typically comprise a repository and software which drives the repository. The software is configured so as to copy all or a portion of the data from a computer to media of the repository. Various different types of repositories are in widespread use. Local backup drives and digital virtual devise (DVD or DVD ROMO repositories are commonly used with smaller data storage requirements and tape storage or large disk drives are used on computers or in networks with large data storage requirements.

The networking of computers had, for a time, simplified the backup process by providing a central data storage location for multiple computers. That is, several client computers were commonly connected to a server and all of the data used by the client computers was stored in a central location by the server. Thus, only the single server needed to be backed up in order to adequately safeguard the data used by all of the client computers.

However, the data storage capacity of the client computers continues to increase and the number of clients on networks has increased, it eventually became more practical to store the large amounts of data required by client computers at the client computers themselves, rather than at the servers where bandwidth restrictions would limit the client computer's access to the data. Thus, we are once again faced with having to backup multiple client computers.

Additional legal and statutory requirements have also been put in place by government organizations through regulations and even local city and state ordinances have been placed requirements on how long data needs to be archived and saved and the type of data that needs to be archived and saved. For example, financial data may need to be archived every day and stored for a period of seven years where legal data can be archived every week and stored for a period of five years. Therefore, in a contemporary network, data may be backed up from a plurality of clients or even locations on a client computer, on a selected one of a plurality of different repositories at a plurality of different locations.

The traditional backup solutions have attempted to address some of these issues by providing the information technology manager (IT Manager) with the ability to manually setup policies for specific data to be saved at a specific location on a specific repository designed for long term storage on a very granular level. Unfortunately, this process is very tedious and is very impractical once one realizes how many types of data are on any given client, the numbers of regulations are on each type of data, how often the data must be archived and the best location to archive the data based on the requirements.

Therefore, it is desirable for the IT Manager to have an integrated data management system that has a central command module that enables the ability to establish data sources, in data paths to repositories with policies in a visual manner that enables a system view with the ability to also view on a granular level.

In addition, role based access control (RBAC) is known as a scheme for access control, in which user access is controlled (i.e. to control access, including allowing or denying access, to data structures and/or data resources based on permission verification or access authorization processes).

For example, US 2008/0022370 A1 relates to a system and method for role based access control (RBAC) in a content management system, wherein storage resources are assigned a protection class. Storage resources in the same protection class share the same access control policy. Permissions granted to various roles are defined based on privilege sets and protection classes. Permissions of a role may be dynamically determined at runtime. Furthermore, as new storage resources are added, they can be assigned to a pre-existing protection class. The new storage resource may thus automatically inherit the various permissions and roles attached to the protection class.

Furthermore, US 2008/0120302 A1 relates to a resource level role based access control (RBAC) for storage management. Resource-identifying information is stored in a role-based access database for a network storage system, in association with role-identifying information for each of a plurality of roles and operation-identifying information. The operation-identifying information indicates one or more authorized operations for each of the plurality of roles and the resource-identifying information identifies specific resources maintained by the network storage system. The role-identifying information, data indicating one or more authorized operations for at least one of the roles, and resource-specific identifying information in the role-based access database are used to determine whether to allow or deny a request from a network storage client to access a resource maintained by the network storage system.

SUMMARY

It is an object to provide a user access control mechanism in a data storage system of multiple storage resources that is highly flexible and efficient in configuring user access of different allowance levels and user types or access permissions, and to provide a reliable and efficient manner of performing access control in a data storage system, particularly in a data storage system managing primary data structures and secondary data structures relating to such primary data structures on the basis of data protection purposes, in particular preferably on the basis of role based access control (RBAC).

A method for controlling user access to a data storage system including one or more nodes providing a plurality of data storage resources according to claim 1 is proposed. Furthermore, there is proposed a data storage system according to claim 17 and a computer program product according to claim 18. Dependent claims relate to preferred exemplary embodiments.

According to some aspects, there is proposed a method for controlling user access to a data storage system including one or more nodes providing a plurality of data storage resources.

In some exemplary aspects, the plurality of data storage resources may store one or more user-accessible primary data structures and/one or more user-accessible secondary data structures. Some or each of the secondary data structures may be stored and/or created on the basis of a respective associated primary data structure.

In some exemplary aspects, the data storage system may store, for some secondary data structures or each secondary data structure, data structure metadata which is indicative of a parent data storage resource and an owner data storage resource of the respective secondary data structure. Herein, the parent data storage resource of the respective secondary data structure preferably is the data storage resource which stores the respective secondary data structure, and/or the owner data storage resource of the respective secondary data structure preferably is the data storage resource which stores the respective associated primary data structure of the respective secondary data structure.

In some exemplary aspects, the data storage system may further store access control information being, for each of one or more user accounts (and/or for each of one or more user roles, each user account being associated with at least one user role), indicative of at least one resource group of one or more data storage resources for which user access by the user associated with the respective user account (and/or its associated user role) is permitted.

According to some aspects, the method may include: receiving a user request to access a certain secondary data structure of the one or more secondary data structures stored on a respective parent data storage resource; determining, based on data structure metadata stored for the certain secondary data structure, the respective owner data storage resource of the certain secondary data structure; and determining whether the user of the user account (and/or user role) associated with the user request is allowed to access the certain secondary data structure based on an access control verification process.

In some exemplary aspects, the access control verification process may include a determination whether the determined owner data storage resource of the certain secondary data structure is permitted to be accessed by the user of the user account (and/or user role) associated with the user request based on the access control information.

In some exemplary aspects, the method may further include accessing the certain secondary data structure of the one or more secondary data structures based on (or according to) the received user request if the access control verification process determines that the user of the user account (and/or user role) associated with the user request is allowed to access the certain secondary data structure, and/or refraining to access the certain secondary data structure of the one or more secondary data structures based on (or according to) the received user request if the access control verification process determines that the user of the user account (and/or user role) associated with the user request is not allowed to access the certain secondary data structure.

In some exemplary aspects, the data storage system may further comprise a user interface controller configured to receive user requests.

In some exemplary aspects, the data storage system may further comprise one or more resource handling controllers, wherein each resource handling controller may preferably be configured to manage user access to one or more data storage resources of the data storage system.

Preferably, the user interface controller is configured to communicate with one or more or all of the one or more resource handling controllers, e.g. for sending access requests to the one or more or all of the one or more resource handling controllers. In some exemplary aspects, the resource handling controllers may be configured to communicate directly with each other and/or to communicate indirectly via the user interface controller.

For example, if a user is logged in to access a primary data structure stored on a certain data storage resource e.g. during a user session, the user access requests of that user to the primary data structure may be received at the user interface controller to be forwarded or relayed (or generally be sent as corresponding user requests which may or may not modify the originally received request) from the user interface controller to the respective resource handling controller managing the certain data storage resource storing the respective primary data structure.

Alternatively, while the user interface controller may still be responsible for setting up a session on session start (e.g. including handling of user authentication and/or user authorization), later user requests may be sent directly to the respective resource handling controller managing the certain data storage resource storing the respective primary data structure.

Also, for example, if a user is logged in to access a primary data structure stored on a certain data storage resource e.g. during a user session, but then may try to access a secondary data structure associated with that respective primary data structure stored on another data storage resource, which may or may not be managed by a different resource handling controller, the user access requests of that user to the secondary data structure may be received at the user interface controller to be forwarded or relayed (or generally be sent as corresponding user requests which may or may not modify the originally received request) from the user interface controller to the respective resource handling controller managing the certain data storage resource storing the respective secondary data structure.

Alternatively, while the user interface controller may still be responsible for setting up a session on session start (e.g. including handling of user authentication and/or user authorization), later user requests to a respective secondary data structure may be sent directly to the respective resource handling controller managing the certain data storage resource storing the respective primary data structure and/or to the respective resource handling controller managing the certain data storage resource storing the respective secondary data structure.

For example, if the user request to a respective secondary data structure is received at the resource handling controller managing the certain data storage resource storing the respective associated primary data structure, if the respective resource handling controller managing the certain data storage resource storing the respective secondary data structure is a different resource handling controller, the received request may be forwarded or relayed (or generally be sent as corresponding user requests which may or may not modify the originally received request) from the respective resource handling controller managing the certain data storage resource storing the respective primary data structure to the respective resource handling controller managing the certain data storage resource storing the respective associated secondary data structure.

In some aspects, the method may be further comprising: performing, upon session start (e.g. when the user of the user account (and/or user role) associated with the user request initiates a communication connection to the user interface controller), an authorization process which preferably obtains, e.g. based on the access control information, a user access control profile indicative of at least one resource group of one or more data storage resources for which user access by the user associated with the respective user account (and/or user role) is permitted; and/or creating, preferably by the user interface controller and/or by an authorization module or authorization apparatus, a payload indicative of the user access control profile of the user associated with the respective user account (and/or user role).

The payload may include the respective user access control profile information in an encoded and/or compressed format, or alternatively include the respective user access control profile information as added information, e.g. as additional or alternative header information.

In some aspects, the method may be further comprising: including (e.g. adding, encoding, attaching or inserting), upon receiving the user request to access the certain secondary data structure at the user interface controller, the created payload within the user request of the user associated with the respective user account (and/or user role).

In some aspects, the method may be further comprising: sending, from the user interface controller, the user request including the created payload to the resource handling controller managing access to the parent data storage resource of the certain secondary data structure.

In some aspects, each resource handling controller may be further configured to manage the data structure metadata relating to the secondary data structures stored on the one or more data storage resources managed by the respective resource handling controller.

For example, the resource handling controller may manage and store the data structure metadata relating to the secondary data structures stored on the one or more data storage resources managed by that respective resource handling controller in a metadata storage section of the respective resource handling controller.

Alternatively, the resource handling controller may exemplarily store the data structure metadata relating to the secondary data structures stored on the one or more data storage resources managed by that respective resource handling controller to the respective data storage resources managed by that respective resource handling controller. For example, the resource handling controller may exemplarily store the data structure metadata relating to a certain secondary data structure to a data storage resource storing the respective certain secondary data structure, e.g. by storing the data structure metadata relating to the certain secondary data structure together with the certain secondary data structure or as part of the certain secondary data structure on the respective data storage resource.

In some aspects, the method may be further comprising: receiving, at the resource handling controller managing access to the parent data storage resource of the certain secondary data structure, the user request including the created payload. Preferably, determining the respective owner data storage resource of the certain secondary data structure and/or determining whether the user of the user account (and/or user role) associated with the user request is allowed to access the certain secondary data structure is performed by the resource handling controller managing access to the parent data storage resource of the certain secondary data structure, preferably, based on the data structure metadata managed by the respective resource handling controller and/or the payload included in the received user request.

In some aspects, determining whether the user of the user account (and/or user role) associated with the user request is allowed to access the certain secondary data structure may be further based on a determination whether the parent data storage resource of the certain secondary data structure is permitted to be accessed by the user of the user account (and/or user role) associated with the user request based on the access control information.

In some exemplary aspects, the method may further include accessing the certain secondary data structure of the one or more secondary data structures based on (or according to) the received user request if the access control verification process determines that the user of the user account (and/or user role) associated with the user request is allowed to access the certain secondary data structure and/or that the user of the user account (and/or user role) associated with the user request is permitted to access the parent data storage resource of the certain secondary data structure; and/or refraining to access the certain secondary data structure of the one or more secondary data structures based on (or according to) the received user request if the access control verification process determines that the user of the user account (and/or user role) associated with the user request is not allowed to access the certain secondary data structure and/or that the user of the user account (and/or user role) associated with the user request is not permitted to access the parent data storage resource of the certain secondary data structure.

In some exemplary aspects, the user of the user account (and/or user role) associated with the user request may be determined to be allowed (permitted) to access the certain secondary data structure under the condition that the respective parent data storage resource of the certain secondary data structure is included in a resource group for which user access by the user associated with the respective user account (and/or user role) is permitted according to the access control information.

For example, the user of the user account (and/or user role) associated with the user request may be determined to be allowed (permitted) to access the certain secondary data structure under the condition that the respective parent data storage resource of the certain secondary data structure is included in a resource group for which user access by the user associated with the respective user account (and/or user role) is permitted according to the access control information and/or that the respective owner data storage resource of the certain secondary data structure is included in the resource group for which user access by the user associated with the respective user account (and/or user role) is permitted according to the access control information.

In some exemplary aspects, the access control information may, for each of the one or more user accounts (and/or for each of one or more user roles, each user account being associated with at least one user role), be further indicative of one or more access levels indicative of a scope of access permitted for the respective user account (and/or user role).

In some exemplary aspects, the one or more access levels may include at least one of the following: (1) a first access level which may indicate that a user of the respective user account (and/or user role) being associated with the first access level is allowed to access, on a respective parent data storage resource, those (e.g. only those) secondary data structures for which the respective owner data storage resources are included in a resource group for which user access by the user associated with the respective user account (and/or user role) is permitted according to the access control information; (2) a second access level which may indicate that a user of the respective user account (and/or user role) being associated with the second access level is allowed to access, on a respective parent data storage resource, (e.g. only) secondary data structures associated with one or more owner data storage resources provided by a node to which the respective user is currently logged in, in particular under the condition that the respective associated owner data storage resource is included in a resource group for which user access by the user associated with the respective user account (and/or user role) is permitted according to the access control information; and/or (3) a third access level which may indicate that a user of the respective user account (and/or user role) being associated with the third access level is allowed to access, on a respective parent data storage resource, the one or more (e.g. all) secondary data structures stored on the respective parent data storage resource, preferably independent of whether the one or more respective associated owner data storage resources are included in a resource group for which user access by the user associated with the respective user account (and/or user role) is permitted according to the access control information.

In some exemplary aspects, the access control information may, for each of the one or more user accounts (and/or user roles), be further indicative of at least one permissible user activity and/or at least one activity group including at least one permissible user activity allowed to be performed, by the user associated with the respective user account (and/or user role), on data storage resources of the resource group for which user access by the user associated with the respective user account (and/or user role) is permitted.

In some exemplary aspects, determining whether the user of the user account (and/or user role) associated with the user request is allowed to access the certain secondary data structure may be further based on a determination whether a respective user activity requested by the user request is permitted to be performed by the user of the user account (and/or user role) associated with the user request based on the access control information.

In some exemplary aspects, the received user request may indicate the certain secondary data structure and a requested activity to be performed on the certain secondary data structure. In such situation, in some exemplary aspects, the method may further comprise executing the requested activity on the certain secondary data structure if it is determined that the respective user activity requested by the user request is permitted to be performed by the user of the user account (and/or user role) associated with the user request and that the user of the user account (and/or user role) associated with the user request is allowed to access the certain secondary data structure, and/or refraining from executing the requested activity on the certain secondary data structure if it is determined that the respective user activity requested by the user request is not permitted to be performed by the user of the user account (and/or user role) associated with the user request or that the user of the user account (and/or user role) associated with the user request is not allowed to access the certain secondary data structure.

In some exemplary aspects, the access control information may include RBAC (role based access control) information which may, for each of the one or more user accounts, be further indicative of a user role of the respective user associated with the respective user account.

In some exemplary aspects, each user role may be associated with at least one permissible user activity and/or at least one activity group including at least one permissible user activity.

In some exemplary aspects, the user access control profile may be further indicative of the user role associated with the user associated with the respective user account, and/or the created payload may be further indicative of the user role associated with the user associated with the respective user account.

In some exemplary aspects, the created payload may be further indicative of the at least one permissible user activity and/or at least one activity group including at least one permissible user activity associated with the respective user role associated with the user associated with the respective user account.

In some exemplary aspects, each resource handling controller may be further configured to manage activity metadata which may, for each of one or more user roles, be indicative of the at least one permissible user activity and/or at least one activity group including at least one permissible user activity associated with the respective user role.

In some exemplary aspects, determining whether the user of the user account (and/or user role) associated with the user request is allowed to access the certain secondary data structure may be further based on a determination whether a respective user activity requested by the user request is permitted to be performed by the user of the user account (and/or user role) associated with the user request based on the activity metadata managed by the respective resource handling controller and the payload included in the received user request.

In some exemplary aspects, the data structure metadata may, for each data structure, be indicative of one of a plurality of tenants being associated with the respective data structure, and/or the access control information may, for each of one or more user accounts, be indicative of one of a plurality of tenants being associated with the respective user account.

In some exemplary aspects, determining whether the user of the user account associated with the user request is allowed to access the certain secondary data structure may be further based on a determination whether the tenant being associated with the certain secondary data structure matches with the tenant being associated with the respective user account based on the access control information and the data structure metadata of the certain secondary data structure.

In some exemplary aspects, the method may further include accessing the certain secondary data structure of the one or more secondary data structures based on (or according to) the received user request if the access control verification process determines that the tenant being associated with the certain secondary data structure matches with the tenant being associated with the respective user account (and/or user role), and/or refraining to access the certain secondary data structure of the one or more secondary data structures based on (or according to) the received user request if the access control verification process determines that the tenant being associated with the certain secondary data structure does not match with the tenant being associated with the respective user account (and/or user role).

According to some aspects, there is further proposed a data storage system including one or more nodes providing a plurality of data storage resources, the plurality of data storage resources being configured to store one or more user-accessible primary data structures and one or more user-accessible secondary data structures, each secondary data structures being stored on the basis of a respective associated primary data structure,
wherein the data storage system is configured to store, for each secondary data structure, data structure metadata which is indicative of a parent data storage resource and an owner data storage resource of the respective secondary data structure, the parent data storage resource of the respective secondary data structure being the data storage resource which stores the respective secondary data structure and the owner data storage resource of the respective secondary data structure being the data storage resource which stores the respective associated primary data structure of the respective secondary data structure, and wherein the data storage system is further configured to store access control information being, for each of one or more user accounts, indicative of at least one resource group of one or more data storage resources for which user access by the user associated with the respective user account is permitted.

In some aspects, the data storage system, or one or more nodes of the data storage system, may be configured, upon receiving a user request to access a certain secondary data structure of the one or more secondary data structures stored on a respective parent data storage resource, to execute: determining, based on data structure metadata stored for the certain secondary data structure, the respective owner data storage resource of the certain secondary data structure, and/or determining whether the user of the user account associated with the user request is allowed to access the certain secondary data structure based on an access control verification process which includes a determination whether the determined owner data storage resource of the certain secondary data structure is permitted to be accessed by the user of the user account associated with the user request based on the access control information.

Furthermore, in some aspects, the data storage system may be configured according to one or more of the above-described (and/or below-described) aspects and/or be configured to execute one or more steps of one or more of the above-described (and/or below-described) method aspects.

According to some aspects, there is further proposed a computer program product for controlling user access to a data storage system including one or more nodes providing a plurality of data storage resources. The data storage system may be provided in one or more of the above described aspects.

In some aspects, the computer program product may comprise computer-readable program instructions which, when running on or loaded into an apparatus or system having at least one processor, cause the at least one processor, e.g. upon receiving a user request to access a certain secondary data structure of the one or more secondary data structures stored on a respective parent data storage resource, to execute: determining, based on data structure metadata stored for the certain secondary data structure, the respective owner data storage resource of the certain secondary data structure; and/or determining whether the user of the user account associated with the user request is allowed to access the certain secondary data structure based on an access control verification process which includes a determination whether the determined owner data storage resource of the certain secondary data structure is permitted to be accessed by the user of the user account associated with the user request based on the access control information.

Furthermore, in some aspects, the computer program product may comprise computer-readable program instructions which, when running on or loaded into an apparatus or system having at least one processor, cause the at least one processor, e.g. upon receiving a user request to access a certain secondary data structure of the one or more secondary data structures stored on a respective parent data storage resource, to execute one or more steps of one or more of the above-described (and/or below-described) method aspects.

While certain exemplary aspects have been described above, it is to be understood that such aspects are merely illustrative of and are not restrictive on the broad invention, and that the exemplary aspects are not limited to the specific constructions and arrangements shown and described above, since various other changes, combinations, omissions, modifications and substitutions, in addition to those set forth in the above paragraphs, are possible.

Those skilled in the art will appreciate that various adaptations, modifications, and/or combination of the just described aspects can be configured. Therefore, it is to be understood that, further aspects may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different aspects described herein may be combined to form other aspects of the present disclosure.

BRIEF DESCRIPTION OF DRAWINGS

FIG. 6B exemplarily illustrates a flow chart of a process for storage handler access request processing at the storage handler according to some other exemplary embodiments.

DETAILED DESCRIPTION OF DRAWINGS AND OF PREFERRED EMBODIMENTS

Figure 1A:
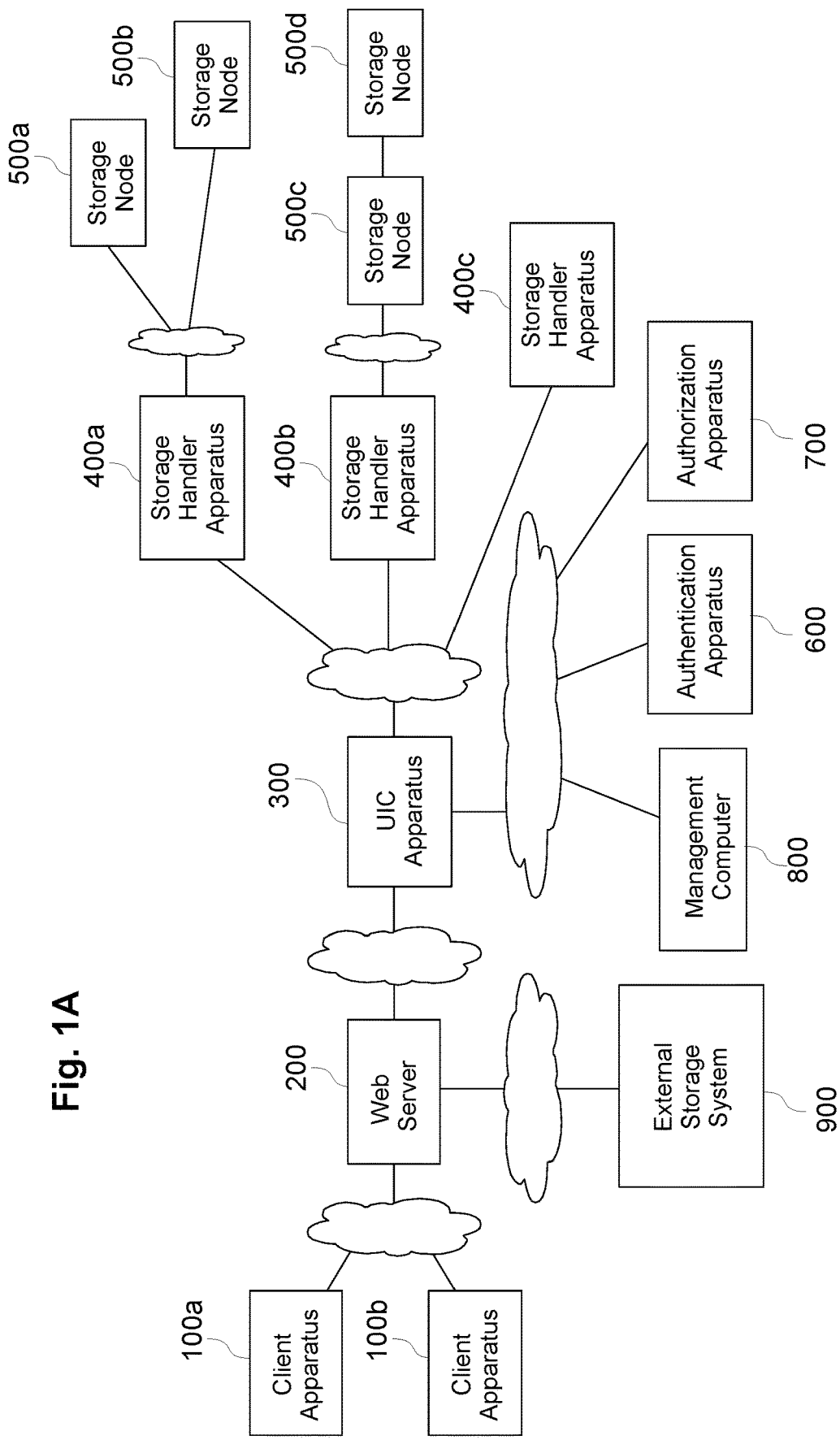
FIG. 1A exemplarily shows a schematic view of a data system according to exemplary embodiments.

In the following, preferred aspects and embodiments of the present invention will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more.

When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary.

With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs referred to as ranges, stripesets, and spans. File system functionality of a file server may include object management, free space management (e.g. allocation) and/or directory management.

An "archive" is a copy or partial copy of data created for long-term retention.

The operation of "asynchronous replication" refers to data transactions that are written to storage and then sent to a destination for backup or replication purposes. Data transactions are held in a memory before being sent over a network and/or to the destination. Also, the transaction may be held in a log file to protect against data loss in the event of system failure. Transactions may be sent from memory and/or from the log file to the destination.

"Backup" refers to a copy or partial copy of data created for operational recovery and/or disaster recovery. Backups may represent full copies of the whole data to be protected, or represent only differential backups storing differences and/or changes of data since an earlier backup. Also, backups may be handled continuously, e.g. by continuous data protection (CDP) or live backup in which the repository is updated with live updates in a continuous manner with or without indexing. Also, backups may be handled in batches, e.g. periodically, wherein the backup is created in batches. Batch backup may refer to an operation in which a repository is updated periodically or at least repeatedly according to scheduled resynchronizations, e.g. involving a scan of the source data for changes since the last backup and only changed data, changed files and/or changed bytes are transferred to the destination for storing.

A "repository" may be a node (or cluster of nodes) that stores data received from a source node (or source cluster of nodes), e.g. for live backup, batch backup, versioning and/or archiving. Versioning may refer to a data protection operation in which a version of files, directories, and/or data portions is taken when it changes (e.g. in each time a document is saved in a file, another version is retained and indexed, e.g. creating multiple generations of data according to the change history).

Exemplary System Overview

FIG. 1A exemplarily shows a schematic view of a data system according to exemplary embodiments.

In the data system of FIG. 1A, a plurality of client apparatuses 100a and 100b (e.g. host computers) are exemplarily connected via a communication network to a web-server 200. The networks in FIG. 1A may each be implemented as a wired communication network (e.g. LAN) or a wireless communication network (e.g. WLAN), or be represented by an Internet connection, or each communication network may be interchanged with a direct communication connection (wired or wireless) in some exemplary embodiments.

The users of the client apparatuses 100a and 100b may, for example, access the webserver 200 via a web browser, e.g. using HTML interfaces and/or REST interfaces or other message transfer protocol interfaces, and/or they may access the webserver 200 via a CLI (command line interface), e.g. using REST interfaces or other message transfer protocol interfaces, and the webserver 200 may provide a plurality of webpages or other type of HTML documents, e.g. to a web browser of the client apparatuses 100a and 100b.

On the other hand, the webserver 200 in the data system of FIG. 1A is exemplarily connected to an external storage system 900 via another communication network (or via the same communication network), and the webserver 200 is further exemplarily connected to a UIC (user interface controller) apparatus 300 via another communication network (or via the same communication network).

The UIC apparatus 300 is exemplarily connected, via another network via another communication network (or via the same communication network) to a management computer 800, an authentication apparatus 600 and an authorization apparatus 700.

Furthermore, the UIC apparatus 300 (user interface controller) is exemplarily connected to a plurality of storage handler apparatuses 400a, 400b and 400c (resource handling controllers) via another network via another communication network (or via the same communication network).

Exemplarily, the (first) storage handler apparatus 400a is communicably connected to a plurality of storage nodes 500a (e.g. a first source node) and 500b (e.g. a first destination node) via another network via another communication network (or via the same communication network). Further exemplarily, the (second) storage handler apparatus 400b is communicably connected to a storage node 500c (e.g. a second source node) via another network via another communication network (or via the same communication network) and the storage node 500c is communicably connected to the storage node 500d (e.g. a second destination node).

In the above, exemplarily a storage node may be a physical storage apparatus providing one or more storage devices for data storage. Also, a storage node may be a logical storage unit providing one or more storage volumes for data storage. In yet other exemplary embodiments, a storage node may represent a storage cluster having plural cluster nodes providing a unified storage space. In general, a storage node may represent a physical, logical or virtual storage entity for storing data.

In general, a source node may represent an entity or machine (e.g. server, workstation or virtual machine) which stores data to be managed. The source node may be configured to monitor one or more file systems of the host and be configured to perform and initiate data protection operations in accordance with user-defined data protection policies. Source nodes may be configured to store data, transfer locally stored data, or implement data tracking, blocking or auditing functions.

A destination node may represent an entity or machine (e.g. server, file server, workstation or virtual machine) which is configured to receive (and store) data such as a repository or general-purpose system designated as a recipient of data in a replication configuration.

In general, a data protection policy is a configurable objective that is mapped to nodes or groups of nodes and defines at least a source node and a destination node. That is, on an abstract level, a data protection policy defines at least one of the source (source node) of a data protection operation, the data to be protected as managed by the source node and the destination (destination node) of a data protection operation performed on the managed data.

Additionally, a data protection policy may further define a data movement operation according to a data path between the defined source and destination nodes. The data movement operation may define the type and/or direction of data protection operations to be performed between the source and destination nodes, e.g. mirror operation, replication operation, backup operation (e.g. batch backup and/or live backup), snapshot operation, archiving operation, versioning operation, and whether the data movement shall occur in batches (e.g. batch backup) or continuously (e.g. continuous data protection or as live backup), or whether the data is moved synchronously, asynchronously or asynchronously with temporarily storing the data into log files.

Further, for each of the data protection operations or for groups of multiple parallel or chained data protection operations, the data protection policy may comprise further policy information such as protection objectives including data retention time (e.g. time for which the data stored by the data protection operation shall be retained at the destination node receiving the data), the frequency, periodicity or time windows at which data protection operations shall occur (e.g. a recovery point objective or the like). Also, additional objectives can define which data needs to be protected (e.g. based on file type, relation to an application, based on user groups or individual user identities etc.) and other time constraints (e.g. time windows that are excluded in which no data protection operations shall occur etc.).

In FIG. 1A, exemplarily, users may login to the data storage system via a client apparatus 100a or 100b, or an administrator may login to the data storage system via the management computer 800. However, such management computer 800 may be optional. For example, in some exemplary embodiments, each client apparatus 100a or 100b may be used as a management computer in that a user having administrative access privileges may login as administrator via a client apparatus 100a or 100b (e.g. under the user role of "Administrator" being associated with administrative access privileges).

The management computer 800 (and/or the client apparatus 100a or 100b, when a user logs in as administrator via the client apparatus 100a or 100b) may be configured to enable changing of settings, management configurations and policies (e.g. data protection policies) of the data storage system.

The UIC apparatus 300 is exemplarily configured to manage user access interactions to the data storage system (e.g. manage routing of user access requests), e.g. to manage access requests to data stored on one or more of the storage nodes 500a to 500d, or even to the external storage system 900.

Accordingly, in exemplary embodiments, the UIC apparatus 300 may be exemplarily configured to communicate via a user interface (e.g. a graphical user interface/GUI, or command line interface/CLI) for the users via the webserver 200. The user interface may be provided to the clients on or by the webserver 200 in exemplary embodiments. In other embodiments, the user interface may be provided to the clients by the UIC apparatus 300 directly or indirectly via the webserver 200.

The UIC apparatus 300 is configured to communicate user access requests, which are received at the UIC apparatus 300 from one of the client apparatuses 100a and 100b and/or the management computer 800, to the storage handler apparatuses 400a to 400c. Specifically, the UIC apparatus 300 may be exemplarily configured to route user access request to the one or more responsible storage handler apparatus 400a, 400b and 400c, which exemplarily would manage execution of the respective user access request.

Each storage handler apparatus 400a, 400b and 400c may be configured to manage data storage resources being provided by the storage nodes 500a to 500d or the external storage system 900. For example, each storage handler apparatus 400a, 400b and 400c (resource handling controller) may be configured to manage one or more storage nodes, or one or more storage resources provided on the one or more storage nodes, of the data storage system, and specifically each storage node and/or storage resource of the data storage system may be managed and/or controlled by one associated storage handler apparatus (resource handling controller).

For example, in FIG. 1A, the storage handler apparatus 400a may be configured to manage one or more data storage resources being provided by the storage nodes 500a and 500b, while the storage handler apparatus 400b may be configured to manage one or more data storage resources being provided by the storage nodes 500c and 500d.

Exemplarily, data protection operations may include copying data from the storage node 500a to the storage node 500b managed by the storage handler apparatus 400a or even copied through the storage handler apparatus 400a, and exemplarily data protection operations may include copying data from the storage node 500c to the storage node 500d managed by the storage handler apparatus 400b instructing such copying operations to be performed by the storage node 500c to copy data to the storage node 500d (which is exemplarily not directly connected to the storage handler apparatus 400b).

Further exemplarily, the storage handler apparatus 400c may be configured to manage one or more data storage resources being provided by the external storage system.

In FIG. 1A, the external storage system 900 is exemplarily connected to the webserver 200. In other exemplary embodiments, the external storage system 900 may also be connected to the UIC apparatus 300 and/or to one or more of the storage handler apparatus(es) 400a to 400c.

Preferably, management of access to the external storage system 900 is managed by the responsible one or more storage handler apparatus(es) 400a to 400c, but messages or access requests from the storage handler apparatus(es) 400a to 400c to the external storage system 900 may be sent directly or may be routed via the UIC apparatus 300 and/or the webserver 200.

For example, for the connection to the external storage system 900, the responsible storage handler(s) may interface with the external storage system 900.

For example, user requests to the external storage system 900 could be routed via the webserver 200 and the UIC apparatus 300 and/or the responsible storage handler apparatus would interact with the external storage system 900 (e.g. directly or indirectly routed via the UIC apparatus 300 and/or the webserver 200).

In some exemplary embodiments, the external storage system 900 can be connected directly to the UIC apparatus 300 and/or one or more of the storage handler apparatuses, e.g. not via the webserver 200.

Figure 1B:
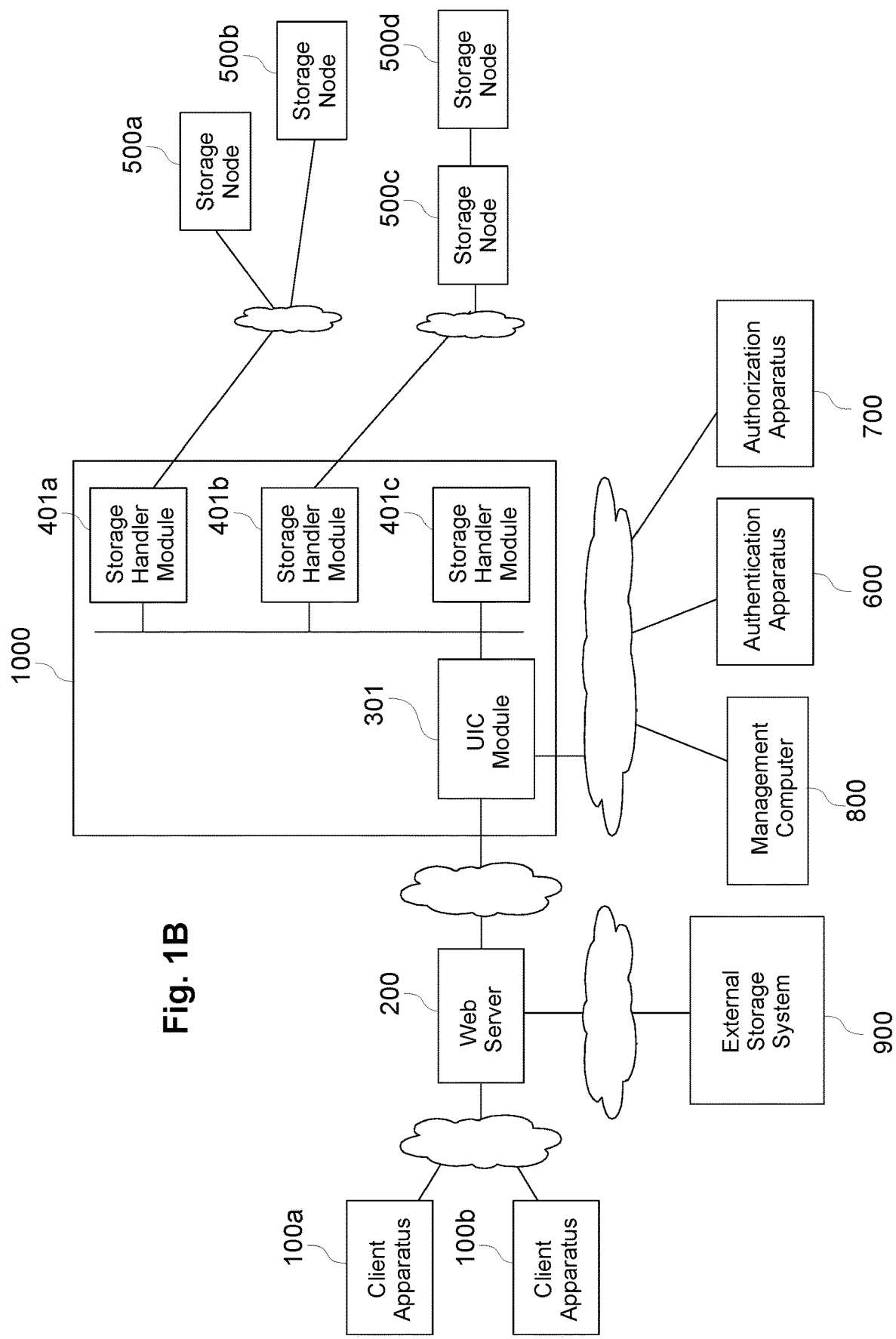
FIG. 1B exemplarily shows a schematic view of another data system according to exemplary embodiments.

FIG. 1B exemplarily shows a schematic view of another data system according to exemplary embodiments.

In the data system of FIG. 1B, similar to FIG. 1A, a plurality of client apparatuses 100a and 100b (e.g. host computers) are exemplarily connected via a communication network to a webserver 200.

The webserver 200 in the data system of FIG. 1B is exemplarily connected to an external storage system 900 via another communication network (or via the same communication network), and the webserver 200 is further exemplarily connected to a UIC (user interface controller) module 301 of a storage management apparatus 1000 via another communication network (or via the same communication network).

Exemplarily, the storage management apparatus 1000 comprises the UIC module 301 and further comprises a plurality of storage handler modules 401a to 401c. The UIC module 301 may work similar and/or provide similar processing functions as the UIC apparatus 300 in FIG. 1A. The storage handler modules 401a to 401c may work similar and/or provide similar processing functions as the storage handler apparatuses 400a to 400c in FIG. 1A.

The UIC module 301 of the storage management apparatus 1000 is exemplarily connected, via another network via another communication network (or via the same communication network) to a management computer 800, an authentication apparatus 600 and an authorization apparatus 700.

Furthermore, the UIC module 301 (user interface controller) is exemplarily communicably connected to the plurality of storage handler modules 401a, 401b and 401c (resource handling controllers) within the storage management apparatus 1000 environment.

Exemplarily, the (first) storage handler module 401a is communicably connected to a plurality of storage nodes 500a (e.g. a first source node) and 500b (e.g. a first destination node) via another network via another communication network (or via the same communication network). Further exemplarily, the (second) storage handler module 401b is communicably connected to a storage node 500c (e.g. a second source node) via another network via another communication network (or via the same communication network) and the storage node 500c is communicably connected to the storage node 500d (e.g. a second destination node).

In FIG. 1B, exemplarily, users may login to the data storage system via a client apparatus 100a or 100b, or an administrator may login to the data storage system via the management apparatus 800 exemplarily connected to the storage management apparatus 1000. However, such management computer 800 may be optional. For example, in some exemplary embodiments, each client apparatus 100a or 100b may be used as a management computer in that a user having administrative access privileges may login as administrator via a client apparatus 100a or 100b (e.g. under the user role of "Administrator" being associated with administrative access privileges).

The management apparatus 800 (and/or the client apparatus 100a or 100b, when a user logs in as administrator via the client apparatus 100a or 100b) may be configured to enable changing of settings, management configurations and policies (e.g. data protection policies) of the data storage system.

The UIC module 301 is exemplarily configured to manage user access interactions to the data storage system (e.g. manage routing of user access requests), e.g. to manage access requests to data stored on one or more of the storage nodes 500a to 500d, or even to the external storage system 900.

Accordingly, in exemplary embodiments, the UIC module 301 may be exemplarily configured to communicate via a user interface (e.g. a graphical user interface/GUI, or command line interface/CLI) for the users via the webserver 200. The user interface may be provided to the clients on or by the webserver 200 in exemplary embodiments. In other embodiments, the user interface may be provided to the clients by the UIC module 301 directly or indirectly via the webserver 200.

The UIC module 301 is configured to communicate user access requests, which are received at the UIC module 301 from one of the client apparatuses 100*a* and 100*b* and/or the management apparatus 800, to the storage handler modules 401*a* to 401*c*. Specifically, the UIC module 301 may be exemplarily configured to route user access request to the one or more responsible storage handler modules 401*a*, 401*b* and 401*c*, which exemplarily would manage execution of the respective user access request.

Each storage handler module 401*a*, 401*b* and 401*c* may be configured to manage data storage resources being provided by the storage nodes 500*a* to 500*d* or the external storage system 900. For example, each storage handler module 401*a*, 401*b* and 401*c* (resource handling controller) may be configured to manage one or more storage nodes, or one or more storage resources provided on the one or more storage nodes, of the data storage system, and specifically each storage node and/or storage resource of the data storage system may be managed and/or controlled by one associated storage handler apparatus (resource handling controller).

For example, in FIG. 1B, the storage handler module 401*a* may be configured to manage one or more data storage resources being provided by the storage nodes 500*a* and 500*b*, while the storage handler module 401*b* may be configured to manage one or more data storage resources being provided by the storage nodes 500*c* and 500*d*.

Exemplarily, data protection operations may include copying data from the storage node 500*a* to the storage node 500*b* managed by the storage handler module 401*a* or even copied through the storage handler module 401*a*, and exemplarily data protection operations may include copying data from the storage node 500*c* to the storage node 500*d* managed by the storage handler module 401*b* instructing such copying operations to be performed by the storage node 500*c* to copy data to the storage node 500*d* (which is exemplarily not directly connected to the storage handler module 401*b*).

Further exemplarily, the storage handler module 401*c* may be configured to manage one or more data storage resources being provided by the external storage system.

Accordingly, as a difference to FIG. 1A, in the exemplary embodiments according to FIG. 1B, the UIC module 301 and the storage handler modules 401*a* to 401*b* are implemented on the same storage management apparatus 1000, instead of being exemplarily implemented as separate apparatuses as exemplarily shown in FIG. 1A. In further exemplary embodiments the UIC module 301 could be implemented on one apparatus and the storage handler modules 401*a* to 401*b* could be implemented on another apparatus.

In general, the UIC (user interface controller) and the storage handlers (resource handling controllers) may be implemented by hardware (including machines, workstations, computers, servers, or also clusters of machines, workstations, computers, servers, or the like) or by software (e.g. by separate or combined software modules executable on machines, workstations, computers, servers, or also on clusters of machines, workstations, computers servers, or the like, or as even distributed cloud services), or by any combination of hardware and software (e.g. as virtual machines or running on one or more virtual machines or the like).

Providing the storage handlers (resource handling controllers) as software module has the benefit that, when additional storage nodes or storage systems are added to provide additional manageable storage resources, such newly added storage resources may be assigned to be managed by one or more of the one or more previously established storage handler modules (resource handling controllers), or one or more new storage handler modules can be initiated, created or installed to manage one or more of the newly added storage resources. For example, in some exemplary embodiments, per newly added storage resource and/or per newly added storage node, a respective new storage handler module (resource handling controller) may be initiated, created or installed to manage the respective newly added storage resource and/or per newly added storage node.

In FIG. 1B, the external storage system 900 is exemplarily connected to the webserver 200. In other exemplary embodiments, the external storage system 900 may also be connected to the storage management apparatus 1000.

Preferably, management of access to the external storage system 900 is managed by the responsible one or more storage handler modules 401*a* to 401*c*, but messages or access requests from the storage handler modules 401*a* to 401*c* to the external storage system 900 may be sent directly or may be routed via the UIC module 301 and/or the webserver 200.

For example, for the connection to the external storage system 900, the responsible storage handler(s) may interface with the external storage system 900.

For example, user requests to the external storage system 900 could be routed via the webserver 200 and the UIC module 301 and/or the responsible storage handler module would interact with the external storage system 900 (e.g. directly or indirectly routed via the UIC module 301 and/or the webserver 200).

In some exemplary embodiments, the external storage system 900 can be connected directly to the UIC module 301 and/or one or more of the storage handler modules, e.g. not via the webserver 200.

Figure 1C:
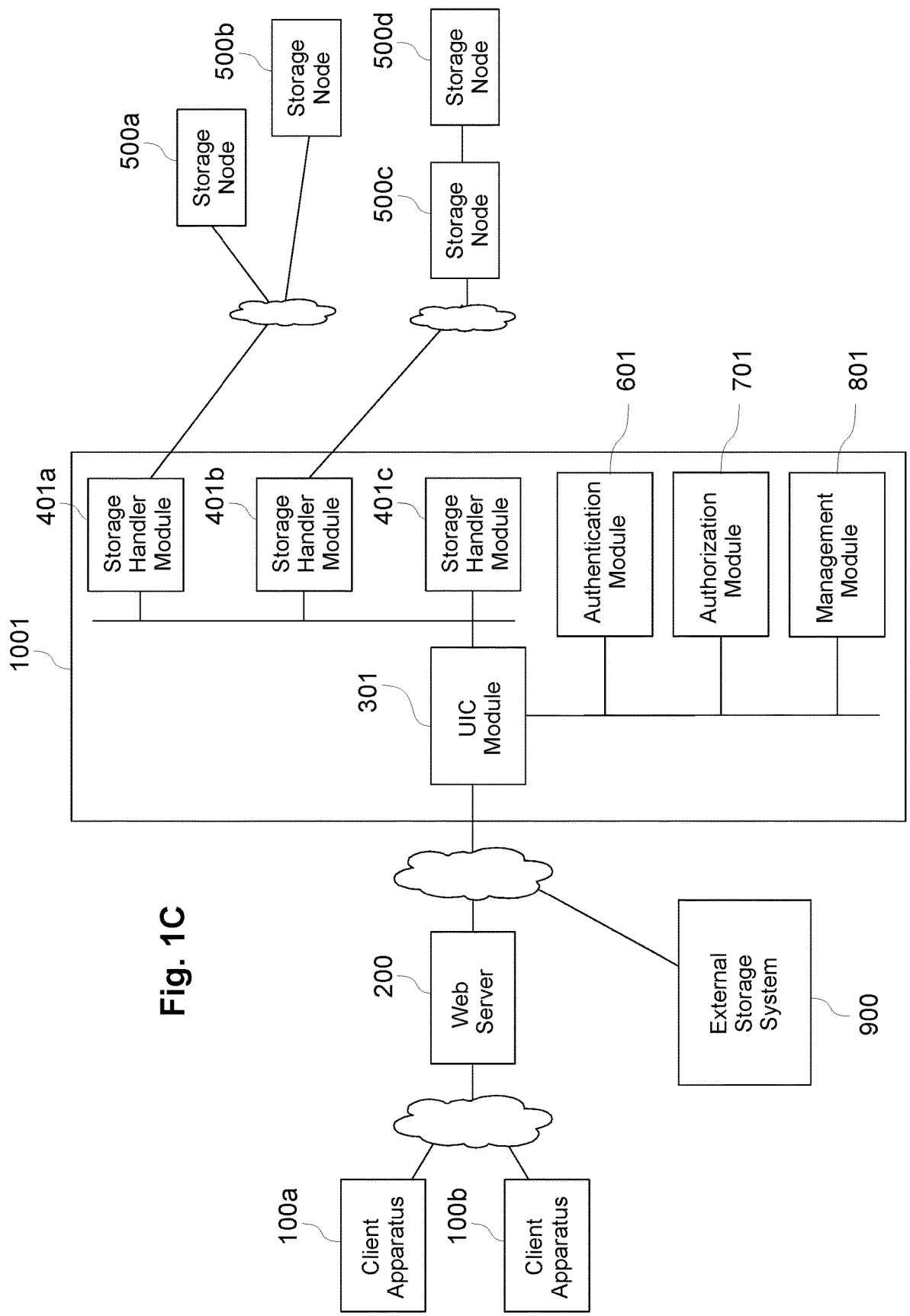
FIG. 1C exemplarily shows a schematic view of another data system according to exemplary embodiments.

FIG. 1C exemplarily shows a schematic view of another data system according to exemplary embodiments.

In the data system of FIG. 1C, similar to FIGS. 1A and 1B, a plurality of client apparatuses 100*a* and 100*b* (e.g. host computers) are exemplarily connected via a communication network to a webserver 200, which is exemplarily connected to an external storage system 900 via another communication network (or via the same communication network), and the webserver 200 is further exemplarily connected to a UIC (user interface controller) module 301 of a storage management apparatus 1001 via another communication network (or via the same communication network).

Exemplarily, the storage management apparatus 1001 comprises the UIC module 301 and further comprises a plurality of storage handler modules 401*a* to 401*c*. The UIC module 301 may work similar and/or provide similar processing functions as the UIC apparatus 300 in FIG. 1A and the UIC module 301 in FIG. 1B. The storage handler modules 401*a* to 401*c* may work similar and/or provide similar processing functions as the storage handler apparatuses 400*a* to 400*c* in FIG. 1A and the storage handler modules 401*a* to 401*c* in FIG. 1B.

The UIC module 301 of the storage management apparatus 1001 is exemplarily connected, via another network via another communication network (or via the same communication network) to a management module 801, an authentication module 601 and an authentication module 701, which are exemplarily also comprised in the storage management apparatus 1001.

Furthermore, the UIC module 301 (user interface controller) is exemplarily communicably connected to the plurality of storage handler modules 401*a*, 401*b* and 401*c* (resource handling controllers) within the storage management apparatus 1001 environment, similar to the configuration in FIG. 1B.

In FIG. 1C, exemplarily, users may login to the data storage system via a client apparatus 100*a* or 100*b*, or an administrator may login to the data storage system via the management module 801 of the storage management apparatus 1001. In some exemplary embodiments, each client apparatus 100*a* or 100*b* may be used as a management computer in that a user having administrative access privileges may login as administrator via a client apparatus 100*a* or 100*b* (e.g. under the user role of "Administrator" being associated with administrative access privileges).

The management module 801 (and/or the client apparatus 100*a* or 100*b*, when a user logs in as administrator via the client apparatus 100*a* or 100*b*) may be configured to enable changing of settings, management configurations and policies (e.g. data protection policies) of the data storage system. However, such management module 801 may be optional. For example, in some exemplary embodiments, each client apparatus 100*a* or 100*b* may be used as a management computer in that a user having administrative access privileges may login as administrator via a client apparatus 100*a* or 100*b* (e.g. under the user role of "Administrator" being associated with administrative access privileges).

The management module 801 may communicate via a user interface for inputting configurations, settings and changes thereof, e.g. via a GUI (graphical user interface) and/or a CLI (command line interface) at the storage management apparatus 1001. The user interface may be provided to the clients on or by the webserver 200 in exemplary embodiments. In other embodiments, the user interface may be provided to the clients by the UIC module 301 directly or indirectly via the webserver 200.

For example, the management module 801 may be configured to be accessed via a graphical user interface and/or command line interface provided via the webserver 200 to the client apparatus(es). Then, users may login to the data storage system via a client apparatus 100*a* or 100*b* to change management settings by accessing the management module 801.

The management module 801 may be provided by software and/or hardware. In some exemplary embodiments, the management module 801 may be part of or included in the UIC module 301. The UIC module 301 is exemplarily configured to manage user access interactions to the data storage system, e.g. to manage access requests to data stored on one or more of the storage nodes 500*a* to 500*d*, or even to the external storage system 900.

Accordingly, in exemplary embodiments, the UIC module 301 may be exemplarily configured to provide a user interface (e.g. a graphical user interface/GUI, or command line interface/CLI) for the users via the webserver 200 to be provided through the webserver 200 at the respective client apparatus/computer.

The UIC module 301 is configured to communicate user access requests, which are received at the UIC module 301 from one of the client apparatuses 100*a* and 100*b* and/or the management module 801, to the storage handler modules 401*a* to 401*c*.

Specifically, the UIC module 301 may be exemplarily configured to route user access request to the one or more responsible storage handler modules 401*a*, 401*b* and 401*c*, which exemplarily would manage execution of the respective user access request.

Each storage handler module 401*a*, 401*b* and 401*c* may be configured to manage data storage resources being provided by the storage nodes 500*a* to 500*d* or the external storage system 900. For example, each storage handler module 401*a*, 401*b* and 401*c* (resource handling controller) may be configured to manage one or more storage nodes, or one or more storage resources provided on the one or more storage nodes, of the data storage system, and specifically each storage node and/or storage resource of the data storage system may be managed and/or controlled by one associated storage handler apparatus (resource handling controller).

For example, for the connection to the external storage system 900, the responsible storage handler(s) may interface with the external storage system 900. For example, user requests to the external storage system 900 could be routed via the webserver 200 and the UIC module 301 and the responsible storage handler(s) would interact with the external storage system 900 (e.g. directly or indirectly routed via the UIC module 301 and the webserver 200). In some exemplary embodiments, the external storage system 900 can be connected directly to the UIC module 301 and/or one or more of the storage handler module, e.g. not via the webserver 200.

In FIG. 1C, exemplarily, the storage handler module 401*a* may be configured to manage one or more data storage resources being provided by the storage nodes 500*a* and 500*b*, while the storage handler module 401*b* may be configured to manage one or more data storage resources being provided by the storage nodes 500*c* and 500*d*.

Exemplarily, data protection operations may include copying data from the storage node 500*a* to the storage node 500*b* managed by the storage handler module 401*a* or even copied through the storage handler module 401*a*, and exemplarily data protection operations may include copying data from the storage node 500*c* to the storage node 500*d* managed by the storage handler module 401*b* instructing such copying operations to be performed by the storage node 500*c* to copy data to the storage node 500*d* (which is exemplarily not directly connected to the storage handler module 401*b*).

Further exemplarily, the storage handler module 401*c* may be configured to manage one or more data storage resources being provided by the external storage system.

Accordingly, as a difference to FIG. 1A but similar to FIG. 1B, in the exemplary embodiments according to FIG. 1C, the UIC module 301 and the storage handler modules 401*a* to 401*b* are implemented on the same storage management apparatus 1001, instead of being exemplarily implemented as separate apparatuses as exemplarily shown in FIG. 1A. In further exemplary embodiments the UIC module 301 could be implemented on one apparatus and the storage handler modules 401*a* to 401*b* could be implemented on another apparatus.

In FIG. 1C, the external storage system 900 is exemplarily connected to the storage management apparatus 1001. In other exemplary embodiments, the external storage system 900 may also be connected through the webserver 200.

Preferably, management of access to the external storage system 900 is managed by the responsible one or more storage handler modules 401*a* to 401*c*, but messages or access requests from the storage handler modules 401*a* to 401c to the external storage system 900 may be sent directly or may be routed via the UIC module 301 and/or the webserver 200.

For example, for the connection to the external storage system 900, the responsible storage handler(s) may interface with the external storage system 900.

For example, user requests to the external storage system 900 could be routed via the webserver 200 and the UIC module 301 and/or the responsible storage handler module would interact with the external storage system 900 (e.g. directly or indirectly routed via the UIC module 301 and/or the webserver 200).

In some exemplary embodiments, the external storage system 900 can be connected directly to the UIC module 301 and/or one or more of the storage handler modules, e.g. not via the webserver 200.

In general, the UIC (user interface controller) and the storage handlers (resource handling controllers) may be implemented by hardware (including machines, workstations, computers, servers, or also clusters of machines, workstations, computers, servers, or the like) or by software (e.g. by separate or combined software modules executable on machines, workstations, computers, servers, or also on clusters of machines, workstations, computers servers, or the like, or as even distributed cloud services), or by any combination of hardware and software (e.g. as virtual machines or running on one or more virtual machines or the like).

Providing the storage handlers (resource handling controllers) as software module has the benefit that, when additional storage nodes or storage systems are added to provide additional manageable storage resources, such newly added storage resources may be assigned to be managed by one or more of the one or more previously established storage handler modules (resource handling controllers), or one or more new storage handler modules can be initiated, created or installed to manage one or more of the newly added storage resources. For example, in some exemplary embodiments, per newly added storage resource and/or per newly added storage node, a respective new storage handler module (resource handling controller) may be initiated, created or installed to manage the respective newly added storage resource and/or per newly added storage node.

Also, the management module 801, the authentication module 601 and the authorization module 701 are exemplarily implemented on the same storage management apparatus 1001, instead of being exemplarily implemented as separate apparatuses as exemplarily shown in FIGS. 1A and 1B.

In general, the management, authentication and authorization apparatuses/modules may be implemented by hardware (including machines, workstations, computers, servers, or also clusters of machines, workstations, computers, servers, or the like) or by software (e.g. by separate or combined software modules executable on machines, workstations, computers, servers, or also on clusters of machines, workstations, computers servers, or the like, or as even distributed cloud services), or by any combination of hardware and software (e.g. as virtual machines or running on one or more virtual machines or the like).

In the above exemplary embodiments, exemplarily, a respective storage handler apparatus/module may be responsible for managing source and/or destination nodes, and handling, managing or controlling data protection operations being performed from the source nodes to the destination nodes. Alternatively or additionally, different storage handler apparatuses/module may manage source nodes or data storage resources provided by source nodes for which the destination nodes or data storage resources provided by destination nodes are managed by another (or multiple other) storage handler apparatus(es)/module(s), and different storage handler apparatuses/modules may manage destination nodes or data storage resources provided by destination nodes for which the source nodes or data storage resources provided by source nodes are managed by another (or multiple other) storage handler apparatus(es)/module(s). Also, in exemplary embodiments, one or more storage handler apparatuses/modules may only manage source nodes or data storage resources provided by source nodes, and other one or more storage handler apparatuses may only manage destination nodes or data storage resources provided by destination nodes.

Exemplary User Authentication Process

For user authentication purposes, the UIC apparatus 300 (or UIC module 301), herein further referred only as UIC (user interface controller), is exemplarily configured to communicate with the authentication apparatus 600 (or authentication module 601) herein further referred only as "authentication module".

For example, if a user logs in via a graphical user interface, a command line interface or another user interface provided by the webserver 200 from a client computer (client apparatus) to the UIC, a corresponding login request may be received at the UIC indicative of a username (or other user identifier) and a password.

Such username (or other user identifier) and password may have been input by the respective user via the user interface (e.g. CLI, or GUI, etc.) of the webserver 200 provided at the client apparatus to the UIC (user interface controller).

Figure 2:
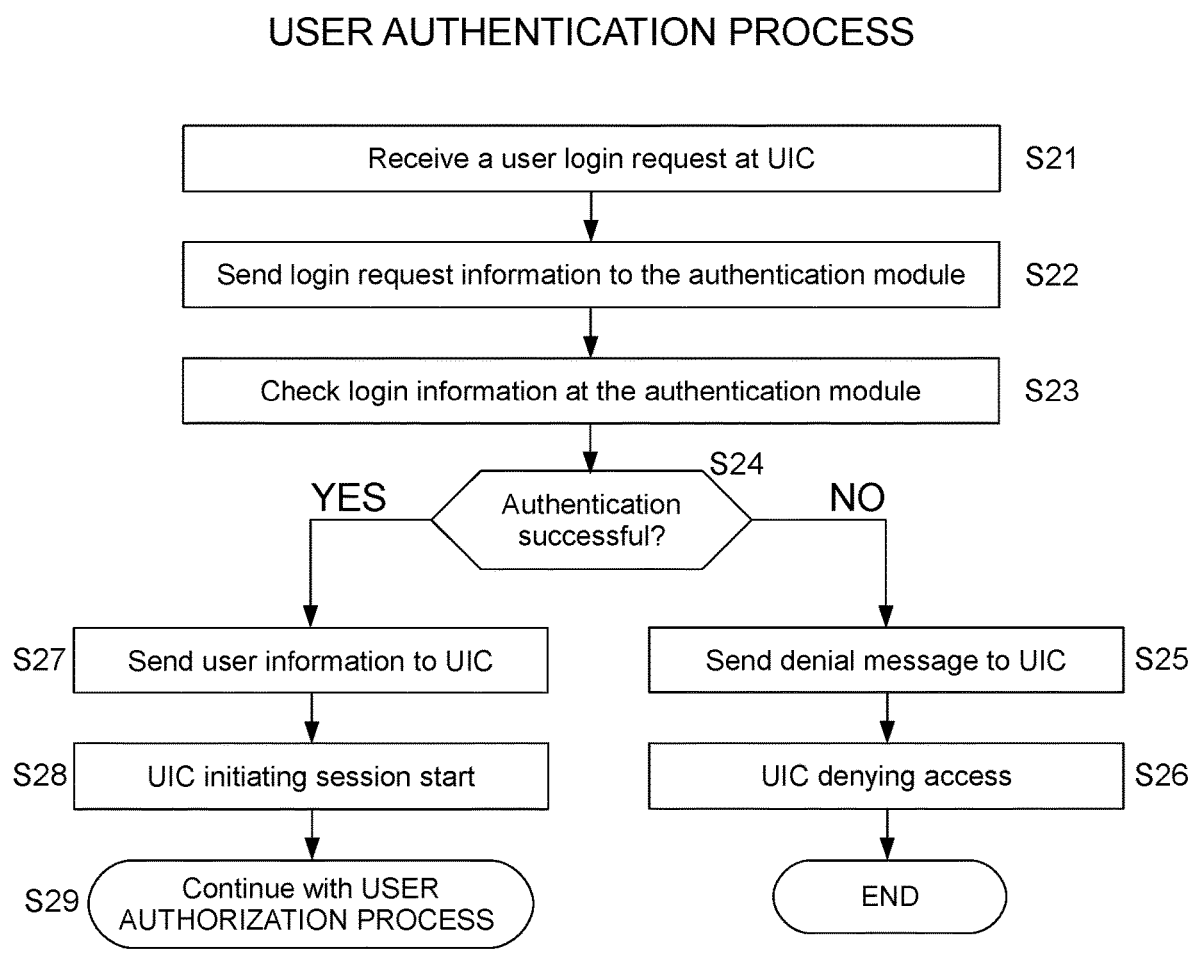
FIG. 2 exemplarily illustrates a flow chart of a process for user authentication processing according to some exemplary embodiments.

FIG. 2 exemplarily illustrates a flow chart of a process for user authentication according to some exemplary embodiments.

Exemplarily, in step S21, the UIC (user interface controller) receives, e.g. via the webserver 200, a login request including a username (and/or user role; if no user role is included, as may be the case in typical exemplary embodiments, optionally a user role may be determined later based on the user profile associated with a username) of a user trying to login from a client apparatus 100a or 100b. The login request further includes exemplarily a password input from the user. The password may be transmitted in encoded and/or encrypted format (e.g. by hashing the password by a pre-determined hashing function or hashing algorithm) with the login request. Also, the password may be sent across the network using other encryption techniques such as, e.g., by using TLS and/or SSL encryption such as e.g. SSLv3 or the like.

In some exemplary embodiments, the login request may further be indicative of a user domain of the user attempting to login to the data storage system. The term user domain or simply referred to as domain as used throughout this specification may refer to domains in a more narrow sense, such as e.g. an Active Directory Domain, or in a more broader sense it may also refer generally to a user's authentication space. A user domain or domain in a general manner may be regarded as a group of users to which users can be added (or from which they may be removed) and which may have one or more sub-groups as well.

In step S22, the UIC sends the received login request or a corresponding login information obtained or decoded from the login request to the authentication module. In case of multiple domains of users, the data storage system may include multiple authentication modules (modules, apparatuses or systems), e.g. in that each authentication module may be responsible for user authentication of users of a respective one or more of the plural domains of users.

In such exemplary embodiments, step 22 may further include a determination of a user domain of the respective user associated with the received login request at the UIC, and a determination of a responsible authentication module to send the received login request (or a corresponding login information obtained or decoded from the login request) to the determined authentication module.

In step S23, the authentication module checks, upon receiving the login request (or a corresponding login information obtained or decoded from the login request) from the UIC, the login request (or user login information) associated with the user received from the UIC to determine whether the user can be authenticated based on authentication data stored in a database of the authentication module.

For example, the authentication of the user can be determined to be successful, if the authentication data stored in a database of the authentication module has authentication data for the username of the respective user associated with the user login request, and if the password or its encrypted representation matches with the authentication data for the username of the respective user associated with the user login request. Otherwise, the authentication of the user can be determined to be successful.

In some exemplary embodiments, the authentication process may be performed by using an external authentication service/system, e.g. by checking the user's credentials against third party authentication systems such as e.g. Active Directory, LDAP or the Local Security Services on a local and/or remote computer. In such case (e.g. instead of the below described authentication process, authentication may be granted or denied based on the interaction with the third party authentication system; and steps S23, S24, S25 and/or S27 or similar may be executed by the third party authentication system).

In step S23, the authentication module exemplarily checks whether the user authentication of the respective user associated with the user login request is successful, e.g. to authenticate that the user login request is actually associated with a pre-registered user (i.e. that the user is who they purport to be).

If step S23 returns NO, the authentication module may simply send a denial message to the UIC in step S25, and the UIC may deny access in step S26 (e.g. by instructing the webserver 200 to provide a message of error or access denial to the user). Then the process may end.

Figure 3:
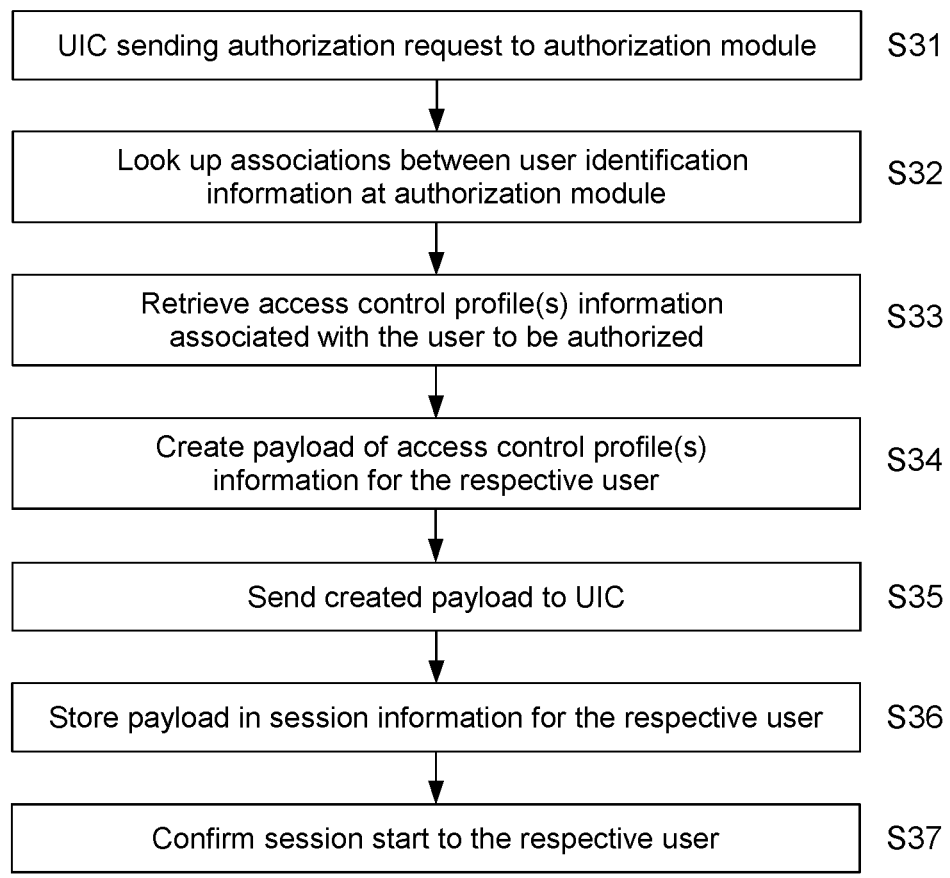
FIG. 3 exemplarily illustrates a flow chart of a process for user authorization processing according to some exemplary embodiments.

On the other hand, if step S23 returns YES, the authentication module sends a confirmation message, e.g. including user information associated with the authenticated user, to the UIC in step S27, and upon receiving the confirmation, the UIC exemplarily initiates a session start for the user associated with the login request in step S28, and continues with a user authorization process for access control purposes in step S29 (see e.g. FIG. 3).

The information sent in S27 referred to as "user information" may, in some exemplary embodiments, be user credential information.

In some exemplary embodiments, the user credential information may confirm the username (and optionally the user domain) of the user associated with the login request, or in other exemplary embodiments, the user credential information may include a user identifier such as a user ID or the like. It may optionally additionally include a hash value of a user's password. Such information usually however does not include a user's password.

In other exemplary embodiments, the user information sent in S27 may not send personal user information, such as a username or the like, but the user information may include "membership information" or "group information" on a group the user belongs to. For example, such user "membership information" may indicate at least one of a group, to which the user belongs, and/or a domain of the user.

The information sent in S27 may be used in the below described authorization process(es) of exemplary embodiments.

It is to be noted that the above authentication process is optional, and in secure environments, the user authentication process may be skipped in some exemplary embodiments. Also, a simpler authentication process may be used, and a user authentication process may also be implemented in the UIC to be directly performed by the UIC.

Furthermore, while the above exemplary authentication process relies on a use of a password, it is to be noted that other authentication process for identifying a certain user associated with a login request may also be (alternatively or additionally) be executed based on biometric information such as face recognition, voice recognition and/or finger print identification, and/or also based on touchscreen finger pattern authentication, etc.

Exemplary User Authorization Process (Access Control Authorization)

For user authorization purposes, e.g. in connection with access control, the UIC is exemplarily configured to communicate with the authorization module/apparatus. For example, if a user logs in (e.g. via a graphical user interface (GUI), a command line interface (CLI) or another user interface provided by the webserver 200 from a client computer (client apparatus)) to the UIC, a corresponding login request may be received at the UIC indicative of a username (or other user identifier).

Upon performing an optional authentication process, e.g. as described above, the UIC may execute initiation of the authorization process based on the username of the user associated with the login request.

Also, the UIC (user interface controller) may execute initiation of the authorization process based on the user information such as user credential information or membership information of the user associated with the login request as provided by the authentication process above, e.g. by using the username and/or a user identifier such as a user ID or the like or by using information on a group and/or domain of the user.

Exemplarily user authorization in some exemplary embodiments is performed by using a role based access control (RBAC) scheme. However, while using a role based access control (RBAC) scheme is a preferred exemplary aspect, in some exemplary embodiments, other access control schemes (without defined user roles) may be used.

Generally, a role based access control (RBAC) scheme may define associations between each of one or more user roles and one or more permissible user activities associated with users of the respective user role, e.g. in that each user associated with a certain user role may be permitted to execute (or request execution of) activities associated with the certain user role.

Such associations between each of one or more user roles and one or more permissible user activities associated with users of the respective user role may be defined in a positive manner that such association defines, for each user role, the one or more activities to be permitted for users of the respective user role. In some exemplary embodiments (additionally or alternatively), such associations between each of one or more user roles and one or more permissible user activities associated with users of the respective user role may optionally be defined in a negative manner that such association defines, for each user role, the one or more activities among a plurality of activities not to be permitted for users of the respective user role.

If another access control schemes (without defined user roles) may be used, the access control scheme may directly define associations between each of one or more users and one or more permissible user activities associated with the respective user, e.g. in that each user may be permitted to execute (or request execution of) activities associated with them, respectively.

Such associations between each of a plurality of users and one or more permissible user activities associated with the respective users may be defined in a positive manner that such association defines, for each user, the one or more activities to be permitted for the respective user. In some exemplary embodiments (additionally or alternatively), such associations between each of a plurality of users and one or more permissible user activities associated with the respective user may be defined in a negative manner that such association defines, for each user, the one or more activities among a plurality of activities not to be permitted for the respective user.

Nevertheless, while the present disclosure is not being limited thereto, using a role based access control (RBAC) scheme is a preferred exemplary aspect in some exemplary embodiments, since such role based access control (RBAC) does not need to define associations of permissible activities for each individual user (where there may be hundreds or even thousands of users in a system), but may allow to define different user groups (of lower number than the total number of users) and each user group being associated with a certain user role associated with a certain set of one or more permissible activities. Also, adding new users to the system (or even new user groups) is more efficient because the new user(s) can be just assigned an appropriate user role which may have been previously defined, or a new user role can efficiently be defined for a new group of many users.

In general, a user role may be associated with one or more activities and/or one or more activity groups of activities, a user of a certain user role being allowed to perform the one or more activities and/or the one or more activity groups of activities associated with that certain user role. For example, a first user role may allow to perform a first activity and/or a first group of activities, while another second role may allow to perform a second activity and/or a second group of activities.

Furthermore, it is to be noted that user roles may in some exemplary embodiments be also associated with resources or be controlled against resources, e.g. in that a certain user role may be associated with certain activities that can be performed by users of that respective user role on certain resources. For example, a first user role may allow to perform a first activity (and/or a first group of activities) on a first resource (and/or on a first group of resources), while another second role may allow to perform a second activity (and/or a second group of activities) on a second resource (and/or on a second group of resources).

Also, in some exemplary embodiments, user roles can be associated with resources, such that user role may be associated with certain resources on which an activity is allowed to be performed. For example, a first user role may allow to perform one or more activities on a first resource (and/or on a first group of resources), while another second role may allow to perform the one or more activities on a second resource (and/or on a second group of resources).

While exemplary aspects of a user authorization process will be described below, a general exemplary aspect of the user authorization process is described herein below in connection with FIG. 3.

In this example, access permissions of a user will be described in access control profile information associated with the certain user currently having logged into a system. Exemplarily, such user authorization process is exemplarily performed by the UIC upon session start (i.e. after login of the user, and optionally upon the confirmation of a successful user authentication process.

FIG. 3 exemplarily illustrates a flow chart of a process for user authorization process according to some exemplary embodiments.

Exemplarily, in step S31 (e.g. after the above authentication process, or directly upon receiving the login request from a certain user), the UI controller (UIC) initiates the user authorization process and sends a corresponding authorization request (e.g. indicative of an identity of the user, e.g. by using a username of the user, a user ID of the user or credential information received from an authentication module or the authentication apparatus 600, and/or indicative of a groups and/or domain of the user) to the authorization module/apparatus.

The authorization module receives the corresponding authorization request for the user associated with the login request and, in step S32, looks up its authorization database which may store associations between a plurality of users and one or more access control profiles. The authorization database may store associations to access control profiles for individual users (e.g. one or more associated access control profiles per user), for groups of users (e.g. one or more associated access control profiles per user group), and/or for user domains (e.g. one or more associated access control profiles per user domain).

Accordingly, the authorization apparatus/module is configured, based on the corresponding authorization request for the user associated with the login request, to determine the one or more access control profiles for the respective user (and/or user group and/or user domain), i.e. the one or more access control profiles associated with the respective user (and/or user group and/or user domain), and/or to determine the one or more access control profiles associated with the user role of the respective user (and/or user group and/or user domain).

For example, the authorization database may store, for each user of a plurality of users (and/or user group and/or user domain), one or more access control profiles associated with the respective user (and/or user group and/or user domain), and/or the authorization database may store, for each access control profile of one or more access control profiles, zero, one or more users (and/or user groups and/or user domains) associated with the respective access control profile.

In addition or alternatively, the authorization database may store, for each user role of one or more user roles, one or more access control profiles associated with the respective user role, and/or the authorization database may store, for each access control profile of one or more access control profiles, one or more user roles associated with the respective access control profile. Then, the authorization database may preferably also store, for each user of a plurality of users (and/or user groups and/or user domains), one (or more) user role(s) associated with the respective user (and/or user group and/or user domain), and/or the authorization database may preferably also store, for each user role of one or more user roles, zero, one or more users (and/or user groups and/or user domains) associated with the respective user role.

In further exemplary embodiments, the authorization database may store user group information which associates each user of a plurality of users with a respective user group of one or more user groups, and/or user group information which associates each user group of one or more user groups with a respective user of a plurality of users. In such exemplary embodiments, the authorization database may further store access control profile association information which associates each of one or more user groups with one or more access control profiles and/or which associates each of one or more access control profiles with one or more user groups.

Here, the group may also refer to a user domain (e.g. users bob@domain.com and mary@domain.com may be different users belonging to the same domain "@domain.com"), and/or the group may also refer to a user group of multiple users in a group (e.g. as a subgroup of all users of a certain domain).

In general, based on the above, by looking up the respective user associated with the respective login request in the authorization database, the authorization module/apparatus is enabled to determine one or more access control profiles associated with the respective user associated with the respective login request, e.g. directly via an association between users and access control profiles, or indirectly via associations including determining the user group and/or the user role associated with the respective user associated with the respective login request.

As explained in more detail below, each access control profile may relate to respective access control profile information, and in preferred exemplary aspects the access control profile information of a certain access control profile may be indicative preferably at least of one or more activities (or user activities) permitted to be performed (or permitted to be requested for execution by the user determined to be associated with the respective access control profile) and of one or more data storage resources (e.g. provided by storage nodes as described above, or being represented by storage nodes as discussed above, e.g. in the sense that the storage node or a group of storage nodes may represent a data storage resource and/or that the storage node or a group of storage nodes may provide one or more storage resources) which are permitted to be accessed by the user determined to be associated with the respective access control profile (e.g. for which one or more data storage resources the user is permitted to perform or request the permitted activities).

In addition (or alternatively) to the above, where in preferred exemplary aspects the access control profile information of a certain access control profile may be indicative preferably at least of one or more activities (or user activities) permitted to be performed by the user and of one or more data storage resources which are permitted to be accessed by the user determined to be associated with the respective access control profile, the access control profile information of a certain access control profile may be indicative of one or more resource groups, each resource group being associated with one or more data storage resources.

In addition (or alternatively) to the above, where in preferred exemplary aspects the access control profile information of a certain access control profile may be indicative preferably at least of one or more activities (or user activities) permitted to be performed by the user and of one or more data storage resources which are permitted to be accessed by the user determined to be associated with the respective access control profile, the access control profile information of a certain access control profile may be indicative of one or more activity groups, each activity group being associated with one or more activities to be permitted (and the access control profile information of the certain access control profile may be further indicative of zero or more activities—e.g. additional activities—in addition to the activity groups).

Further preferably, in a role based access control (RBAC) scheme, the access control profile information of a certain access control profile may be indicative of one or more user roles, each user role being preferably associated with one or more activity groups (each activity group being associated with one or more activities) and with zero or more activities, or with one or more activities (e.g. if there is already at least one association with an activity group).

Further preferably, in some exemplary embodiments, the access control profile information of a certain access control profile may exemplarily be indicative preferably of one or more access levels (e.g. one access level per resource group). The access levels and exemplary effects thereof will be described further below.

Figure 4:
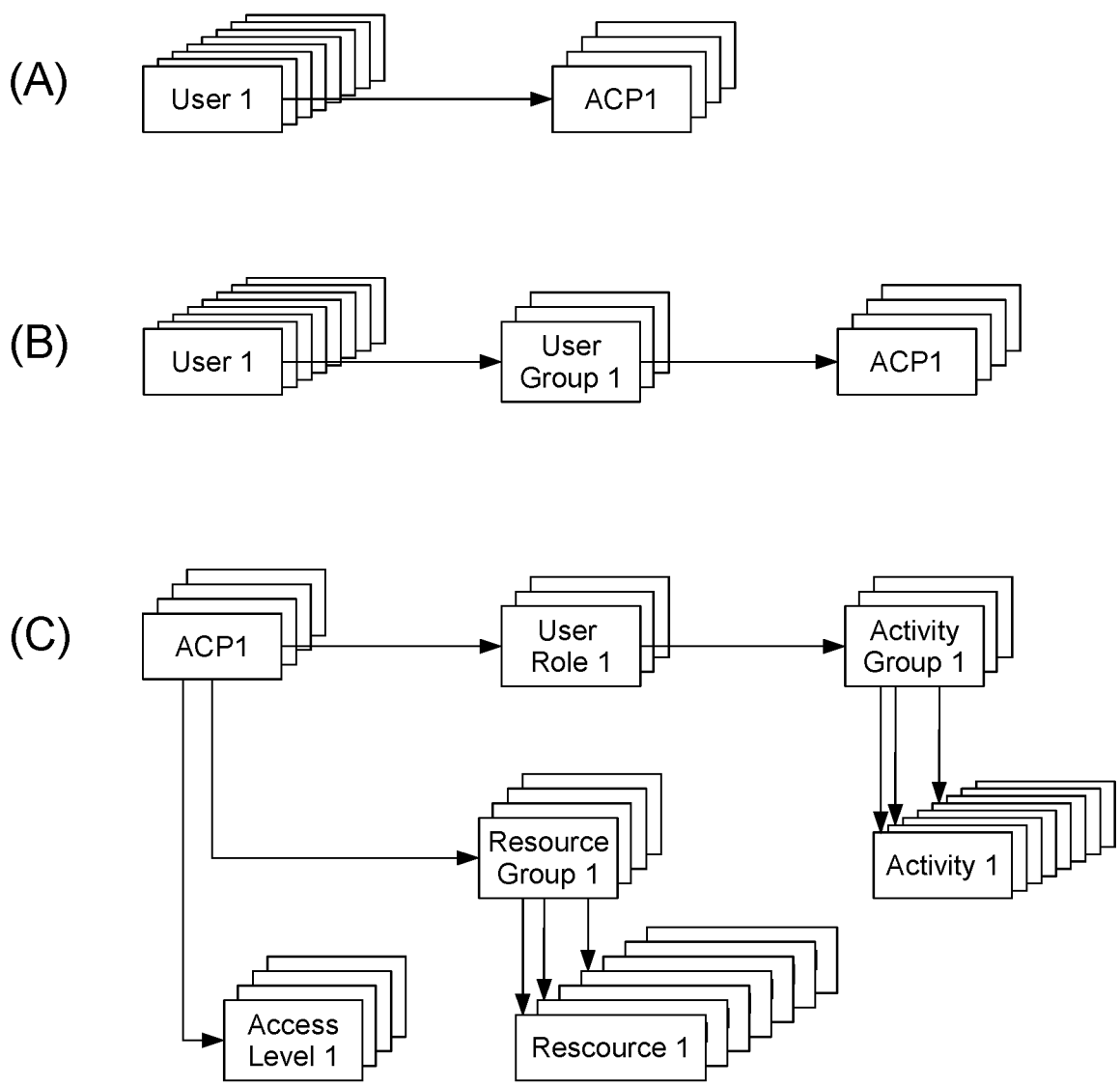
FIG. 4 exemplarily illustrates an example of associations between users and user related access control profiles and associations of the access control profile information according to some exemplary embodiments.

FIG. 4 exemplarily illustrates an example of associations between users and user related access control profiles and associations of the access control profile information according to some exemplary embodiments.

Exemplarily, the access control profile of FIG. 4 is based on role based access control (RBAC), wherein the invention is not limited to role based access control (RBAC), as mentioned above. For example, instead of (or in addition to) associating each of a plurality of users with at least one user role, and associating each user role with one or more respective access control profiles, users could be directly associated with respective one or more access control profiles, e.g. without using user roles.

In general, in preferred exemplary aspects, each of a plurality of users is associated with one or more access control profiles (e.g. dependent on its user identity, according to the one or more user groups of a certain domain the user belongs to, and/or according to the one or more domains the user belongs to).

An ACP (access control profile) association is represented by management information which associates each of a plurality of users with respective one or more access control profiles.

For example, an authorization database of the authorization module/apparatus may store access profile association information which may be indicative of one or more of the following:

one or more associations (access control profile associations), wherein each association may be provided for an individual user, a group of users (user group), and/or a domain;
each association may be indicative of (or contain) one or more access control profiles;
each access control profile may be indicative of (or contain) a user role and/or a resource group;
in each access control profile, preferably for each resource group, an access level can be specified;
each user role may be associated to one or more activities and/or one or more activities, wherein each activity group may be associated with one or more activities (user activities);
each resource group may be associated with one or more storage resources.

In view of the above, if a user (or user group to which the user belongs) is determined to be associated with a certain access control profile (access control profile association), the user may be granted access such as to be allowed to execute/perform the one or more activities associated with the user role indicated in the access control profile and/or the one or more activities associated with the activity group associated with the user role on the storage resources that are included in the resource group(s) indicated in the associated access control profile according to the respective access level indicated for the respective resource group.

It is to be noted that a certain user can be associated with multiple access control profiles. For example, if the authorization database stores access control profiles for individual users, user groups and domains, a user bob@domain.com may be assigned multiple access control profiles, e.g. a first access control profile ACP1 associated with the individual user "bob", a second access control profile ACP2 associated with the domain "domain.com" and potentially one or more further access control profiles associated with the one or more user groups to which the user "bob" may belong.

For example, FIG. 4 (A) exemplarily illustrates that a user "user 1" (of a plurality of users) is associated with an access control profile "ACP1" (of a plurality of access control profiles), as exemplarily indicated with the arrow in FIG. 4 (A). Alternatively or in addition, e.g. as in FIG. 4 (B), a user "user 1" (of a plurality of users) can exemplarily be associated with a user group "user group 1" (of a plurality of user groups, each being associated with one or more users) which is associated with the access control profile "ACP1" again (e.g. a user group which is associated with a group of users that are associated with a certain user role, e.g. regular user, superuser, and/or administrator, etc.).

Accordingly, each user can be associated with one or more access control profiles. And, the authorization module/apparatus can, based on such authorization association information determine the one or more access control profiles (of plural access control profiles) being associated with a certain user, e.g. the user which logged into the UIC and is to be authorized.

Access permissions for the user are exemplarily indicated in access control information associated with the respective access control profile(s). Therefore, access control profile information may be stored for each defined access control profile, e.g. according to associations of FIG. 4 (C).

In FIG. 4 (C), exemplarily, the access control profile "ACP1" (of a plurality of access control profiles) is exemplarily associated with the user role "user role 1" (of a plurality of user roles). Further exemplarily, the user role "user role 1" (of a plurality of user roles) is associated with an activity group "activity group 1" (of a plurality of activity groups), which is exemplarily associated with the activities "activity 1" and "activity 2" (of a plurality of activities). The user role may also directly be associated with zero, one or more activities of the plurality of activities. Each access control profile may be associated with a user role being associated with one or more activity groups and zero, one or more activities, and each activity group may be associated with one or more activities.

In FIG. 4 (C), exemplarily, the access control profile "ACP1" (of a plurality of access control profiles) is exemplarily associated with a resource group "resource group 1" (of a plurality of resource groups), and the resource group "resource group 1" (of a plurality of resource groups) is exemplarily associated with the storage resources "resource 1", "resource 2" and "resource 3". Each access control profile may be associated with one or more resource groups, and each resource group may be associated with one or more resources.

In FIG. 4 (C), exemplarily, the access control profile "ACP1" (of a plurality of access control profiles) is exemplarily associated with an access level "access level 1" (of a plurality of access levels). Each access control profile may be associated with one or more access levels. Preferably, the access control profile is associated with a respective access level for each resource group associated with the respective access control profile, e.g. by associating each resource group with a respective access level.

In summary, the association information and the access control profile information of FIG. 4 exemplarily indicates that the respective user "user 1" is associated with the access control profile "ACP 1" which indicates that the user "user 1" has user role "user role 1" and is permitted to access the storage resources "resource 1", "resource 2", and "resource 4" according to the resource group "resource group 1" based on the access level "access level 1", and the user "user 1" is permitted to perform (or request execution of) the activities "activity 1" and "activity 2" and "activity 5" of the activity group "activity group 1" on the storage resources "resource 1", "resource 2", and "resource 4" according to the resource group "resource group 1" based on the access level "access level 1".

Accordingly, exemplarily, an access control profile indicates that the respective user has associated with the respective access control profile "ACP 1" is permitted to access the storage resources according to the associated resource group(s) based on the associated access level, and that the respective user is permitted to perform (or request execution of) the activities of the associated activity group and/or the associated activities on the storage resources according to the associated resource group(s) based on the associated access level.

Returning to FIG. 3, in step S33, based on the lookup of step S32, the authorization module/apparatus retrieves the one or more access control profiles (and/or the corresponding access control profile information) associated with the user being associated with the login request and/or authorization request, and corresponding access control profile information being indicative of the determined one or more access control profiles associated with the user being associated with the login request and/or authorization request is used to create a payload (step S34) which is sent from the authorization module/apparatus to the UIC (user interface controller) in step S35.

In step S37, the UIC (user interface controller) exemplarily confirms the session start for the then (authenticated and) authorized user by sending a confirmation message through the webserver 200.

Exemplarily, in step S34 (which may be executed in parallel, before or after step S37), a payload of access control information for the respective user is created. Accordingly, in some exemplary embodiments, the authorization apparatus/module is responsible for creating the payload for that respective user based on the obtained access control profile(s) associated with the user, and the created payload is sent to the UIC (user interface controller). In other exemplary embodiments, the authorization apparatus/module may send the obtained access control profile(s) associated with the user or access control profile information indicative of the access control profile(s) associated with the user to the UIC, and in such exemplary embodiments the payload may be created at the UIC based on the received access control profile(s) or access control profile(s) information.

The payload is preferably indicative of the corresponding access control profile information obtained by the authorization apparatus/module for the respective user associated with login request. In some exemplary preferred aspects, the corresponding access control profile information may be encoded, e.g. in a compressed compressed data format, when creating the payload.

Such payload provides the benefit that authorization processes as above do not need to be performed later again, but the respective access control profile information for the respective user can be kept stored (e.g. in cache, NVRAM, or on storage devices, e.g. in a session database, of the UIC) e.g. for the entire session until the user logs out again or even longer to be kept until the user logs in again to be re-used (at least unless the access control profiles of the user have not been reset or reconfigured in the meantime).

Furthermore, such payload provides the benefit that the UIC can embed the payload into access request (e.g. by attaching the payload to such access request, or by encoding or adding the payload into such access request or header section thereof). Then, while a first authorization processing is performed by the UIC in a centralized manner, later access control per access request can be efficiently and reliably be done in a distributed manner in that storage handling apparatuses (resource handling controllers) can perform individual access control per access request at endpoint, i.e. at the data access points of the data storage system, e.g. on the storage handling apparatuses (resource handling controllers), on the respective nodes and/or by storage controllers for accessing the storage resources.

Accordingly, more efficient access control in a distributed manner (e.g. with significantly reduced workload burden on a central authorization system due to avoiding the necessity of processing of inquiries to/from a centralized authorization system on a per-access-basis, and/or with significantly reduced communication bandwidth within the system due to avoiding the necessity of inquiries to/from a centralized authorization system on a per-access-basis).

Moreover, in an optional step S36, the UIC exemplarily stores the created payload (and/or the received access control profile information) for the respective user as session information associated with the session of the user. Such session information may be stored by the UIC in a session management information memory section as session management information for each of one or more currently logged in users including the respective user of the currently initiated session.

This has the benefit that, when an access request is received from a currently logged in user (for which a session is running) at the UIC, the UIC may embed the respective payload into/onto the access request before routing the access request to the one or more responsible storage handler apparatuses (resource handling controllers).

Also, if the access control profile(s) of one or more currently logged in users may change (e.g. in that an administrator user reconfigured any of the above associations as managed by the authorization apparatus/module, e.g. by redefining resource groups, adding resources to resource groups or removing resources from resource groups, and/or by redefining user roles and/or activities or activity groups associated with users or user roles, and/or by redefining activity groups, adding activities to activity groups or removing activities from activity groups, and/or by changing access levels in user access control profiles, etc.), the authorization apparatus/module may inform the UIC accordingly (e.g. by notification message).

The UIC may be configured to check the session information which is affected by the notified changes of access control profiles or underlying associations, and the determined affected session information may be appropriately be updated during the current sessions for affected users, e.g. by requesting the recreation and/or updating the associated payload and/or access control profile information.

Then, upon receiving new access requests from affected users, the updated/recreated payload reflecting the change on run-time during the ongoing session may be embedded into/onto such newly received access requests from affected users having changed access control profiles.

Here, multiple exemplary embodiments may be realized, as described in connection with FIGS. 5A to 5E below.

In general, the UIC may, upon receiving a notification from the authorization module/apparatus that a change has been made (and access control profile information and/or access control profile association information may have been changed) and upon determination which currently logged-in users are affected, the UIC may immediately update (or request to update) the session information for these users. For example, the UIC may indicate for the affected logged-in users that the stored session information and payload is "out-of-date" and when a new access request from such user is received, a new payload may be created (e.g. by the UIC requesting the creation of a new payload from the authorization module/apparatus). Also, in other exemplary embodiments, the session information and payload of all affected users may be updated/recreated at the time of receiving the notification from the authorization module/apparatus that a change has been made.

Exemplary UIC Access Request Processing

Figure 5A:
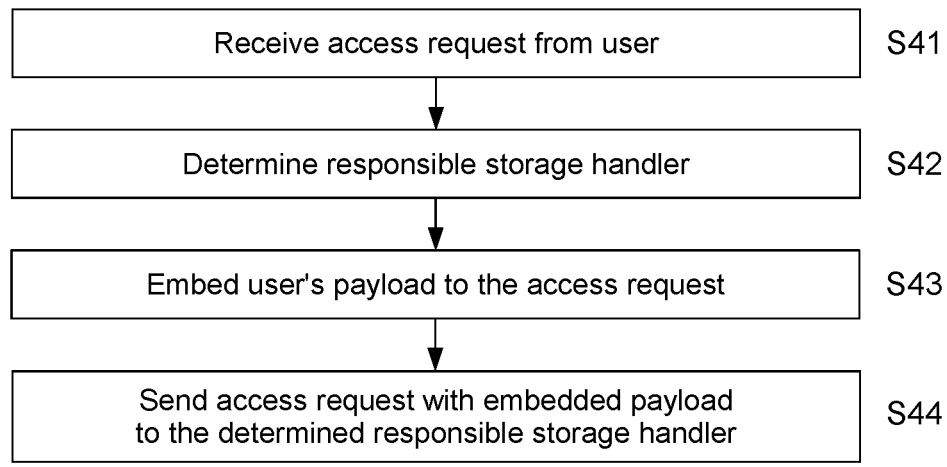
FIG. 5A exemplarily illustrates a flow chart of a process for UIC access request processing at the UIC according to some exemplary embodiments.

FIG. 5A exemplarily illustrates a flow chart of a process for UIC access request processing at the UIC according to some exemplary embodiments.

Exemplarily, in step S41, the user interface controller (UIC) may receive an access request to storage from a user, which has been previously authenticated and/or authorized based on the above, and/or for which a session has been initiated previously. The access request may be indicative of one or more data structures stored on one or more storage resources of the data storage system to be accessed (i.e. which data structures stored one storages resource is/are requested to be accessed by the received access request).

Furthermore, in some exemplary embodiments, the access request may be indicative of one or more activities to be executed on the one or more data structures stored on one or more storage resources of the data storage system indicated by the access request.

Access requests may relate to data operations such as writing data, copying data, reading data, etc., in connection with data of data structures stored on one or more storage resources of the data storage system.

However, access requests may relate also to viewing, configuring or changing data protection operation settings for data structures stored on one or more storage resources of the data storage system, e.g. configuring and/or setting data protection policies, snapshot policies, replication policies, mirroring policies, backup policies, etc., e.g. relating to the execution of data protection operations of copying data of a data structure completely, partially or in modified manner from a source node to a destination node, or from a source data storage resource to a destination data storage resource, such as defining source and destination nodes, setting policies such as which data shall be copied from where to where at which time, frequency or based on which occurrence of an event.

In step S42, based on the received access request (e.g. based on a target node and/or target storage resource, and/or target data structure to be accessed), the UIC determines the storage handler (resource handling controller) being responsible for managing and/or controlling access based on the access request, e.g. by determining the respective storage handler (resource handling controller) being responsible for managing and/or controlling the respective target node and/or target storage resource, and/or target data structure to be accessed based on the access request.

Since the user has been authorized before, a payload has been created being indicative of the one or more access control profiles associated with the user associated with the received access request.

In step S43, the previously created payload being indicative of the one or more access control profiles associated with the user associated with the received access request is embedded to the access request, and the access request with the embedded payload is sent from the UIC to the determined responsible storage handler (resource handling controller) in step S44 to be further processed by the responsible storage handler (resource handling controller).

Accordingly, without the necessity to inquire again the UIC, the storage handler can efficiently and reliably perform access control processing based on the payload since the payload includes the information of the access control profile.

However, if an administrator in the meantime (e.g. during the ongoing session of a user) changes any of the above associations, e.g. by reconfiguring user roles, activity groups, and/or resource groups, or other information of the above associations, such modifications will be reset at the authorization apparatus/module. In order to timely reflect such potential changes (without the necessity to perform authorization processing at each receipt of an access request), the UIC may in some exemplary embodiments manage session information indicative of currently logged in users and their payloads and/or access control profiles, and the UIC may, based on notifications of configuration changes received from the authorization apparatus/module, update the respective session data to be configured to keep updated payload information and embed updated payloads for requests from users of ongoing sessions.

Figure 5B:
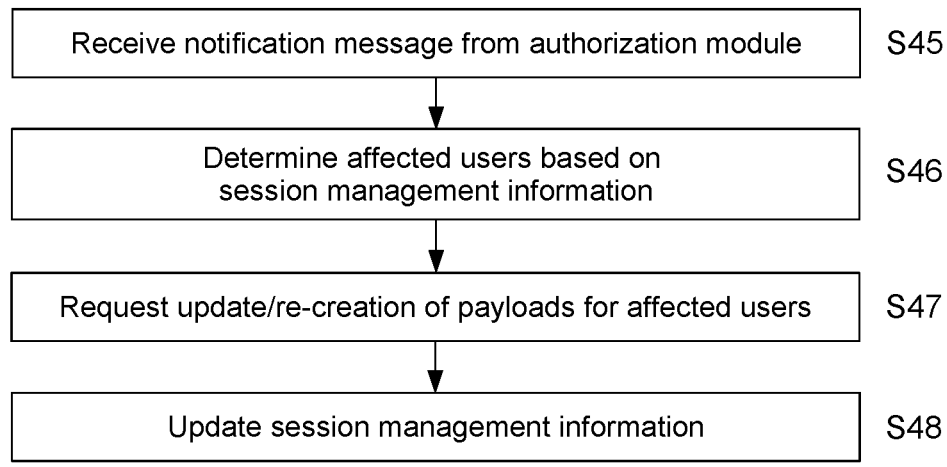
FIG. 5B exemplarily illustrates a flow chart of a process for UIC session management processing at the UIC according to some exemplary embodiments.

FIG. 5B exemplarily illustrates a flow chart of a process for UIC session management processing at the UIC according to some exemplary embodiments.

Exemplarily, in step S45, the UIC receives a notification message from the authorization apparatus/module which indicates that access control profile information may have been changed due to resetting or reconfiguration or change of access control profiles, user roles, activity groups, and/or resource groups, or other information of the above associations.

In step S46, based on the received notification message, the UIC determines affected users of ongoing sessions based on the session management information. For example, based on the notification message and the access control profile information stored for currently logged in users, the UIC determines the affected users by determining the access control profiles and/or payloads stored in the session management information.

In step S47, based on the received notification message, the UIC requests the authorization apparatus/module to update or recreate the payloads for the affected users and, upon receiving the updated or newly created payloads from the authorization apparatus/module, the UIC updates the session management information, accordingly, in step S48.

That is, when a new access request is received from an affected user, the payload to be embedded according to the above steps S41 and S44 is the updated payload reflecting already the change of access control profile information for the affected user, although the change occurred during the ongoing session of that affected user.

In the above, exemplarily, the UIC determines the affected users independent of whether the users may send further access requests or not. Alternatively, in other exemplary embodiments, it is possible that only upon receipt of an access request from a user is it determined whether the user was affected by the recent change of access control profile information, see e.g. FIG. 5C, or that, only if another access request is received from an affected user, the payload for that user is recreated/updated when the access request is received, see e.g. FIGS. 5D and 5E.

Figure 5C:
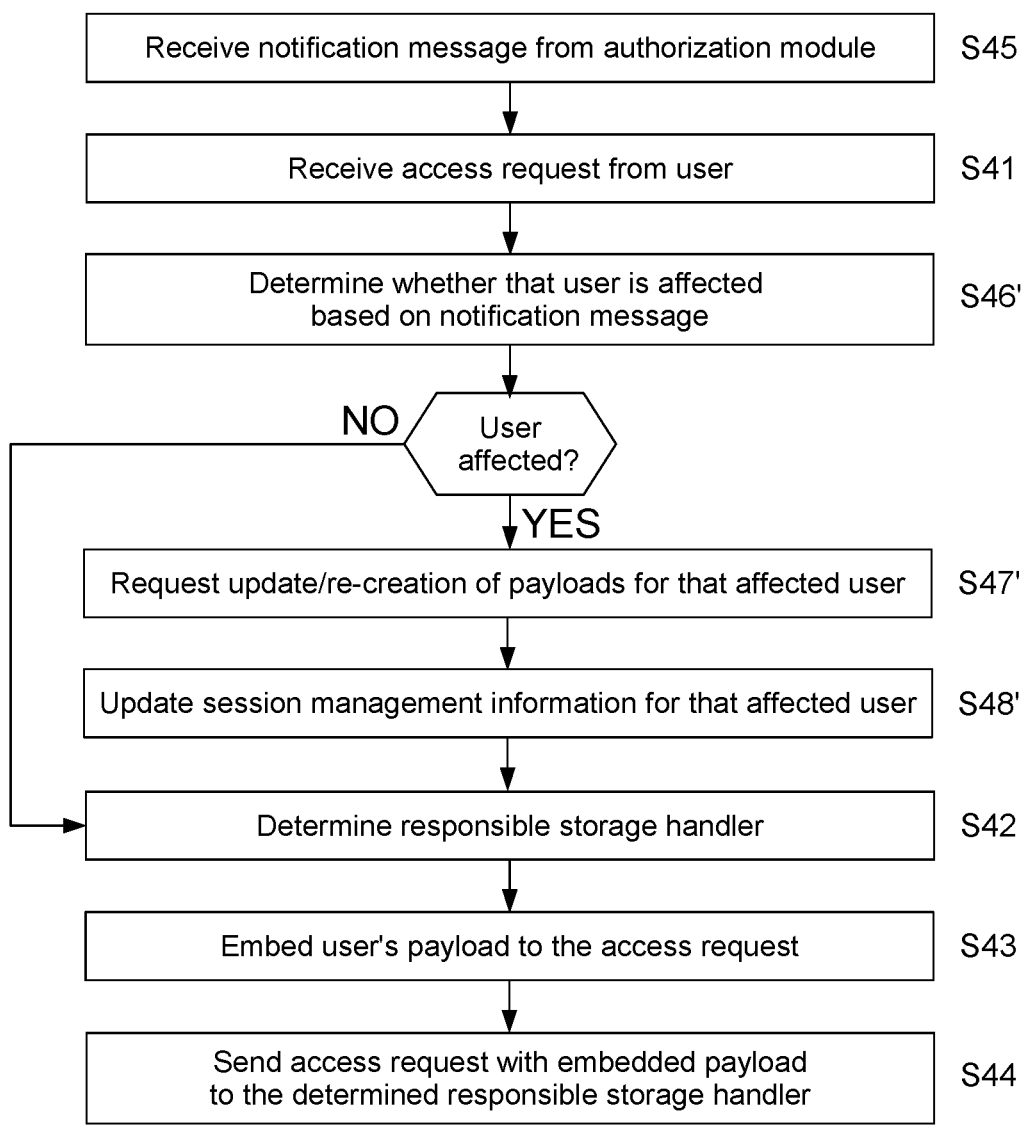
FIG. 5C exemplarily illustrates a flow chart of a process for UIC access request processing at the UIC according to some other exemplary embodiments.

FIG. 5C exemplarily illustrates a flow chart of a process for UIC access request processing at the UIC according to some other exemplary embodiments.

Exemplarily, in step S45, the UIC receives a notification message from the authorization apparatus/module which indicates that access control profile information may have been changed due to resetting or reconfiguration or change of access control profiles, user roles, activity groups, and/or resource groups, or other information of the above associations.

Exemplarily, in step S41, the user interface controller (UIC) may receive an access request to storage from a user, which has been previously authenticated and/or authorized based on the above, and/or for which a session has been initiated previously. The access request may be indicative of one or more data structures stored on one or more storage resources of the data storage system to be accessed (i.e. which data structures stored one storages resource is/are requested to be accessed by the received access request).

In step S46', based on the received notification message of step S45, the UIC determines, based on the session management information stored for the user associated with the access request, whether the respective user was affected by the changes indicated in the notification message, e.g. by referring to the previously created payload associated with that respective user and/or the associated access control profile of the respective user. For example, based on the notification message and the access control profile information stored for the respective user, the UIC determines whether the respective user is affected by the changes.

If step S46' returns NO, the process continues with steps S42, S43 and S44 similar to FIG. 5A above. However, if step S46' returns YES, the method continues with steps S47' and S48'.

In step S47', the UIC requests the authorization apparatus/module to update or recreate the payload for the respective affected user and, upon receiving the updated or newly created information at the UIC, the UIC updates the session management information for the respective affected user, accordingly, in step S48'.

That is, when a new access request is received from an affected user, the payload to be embedded in S44 is the updated payload reflecting already the change of access control profile information for the affected user, although the change occurred during the ongoing session of that affected user. Then, the process continues with steps S42, S43 and S44 similar to FIG. 5A above.

Figure 5D:
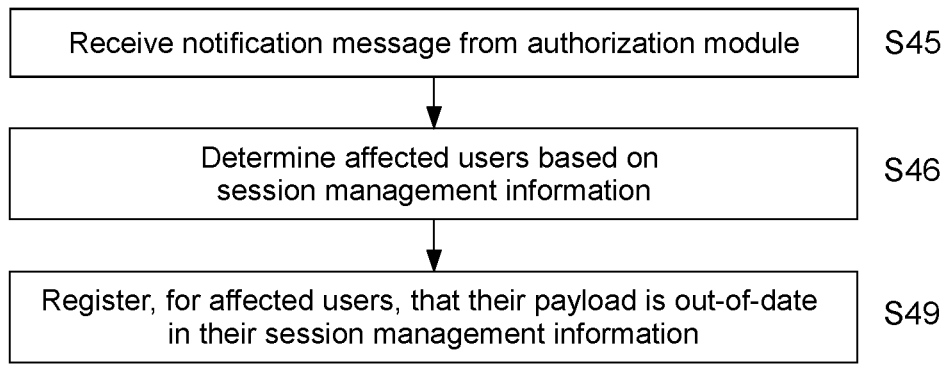
FIG. 5D exemplarily illustrates a flow chart of a process for UIC session management processing at the UIC according to some other exemplary embodiments.

FIG. 5D exemplarily illustrates a flow chart of a process for UIC session management processing at the UIC according to some other exemplary embodiments.

Exemplarily, in step S45, the UIC receives a notification message from the authorization apparatus/module which indicates that access control profile information may have been changed due to resetting or reconfiguration or change of access control profiles, user roles, activity groups, and/or resource groups, or other information of the above associations.

In step S46, based on the received notification message, the UIC determines affected users of ongoing sessions based on the session management information. For example, based on the notification message and the access control profile information stored for currently logged in users, the UIC determines the affected users by determining the access control profiles and/or payloads stored in the session management information.

Then, in step S49, the UIC updates the session management information for the determined affected user(s) to indicate that the payload and access control profile(s) of these users as indicated in the session management information is outdated ("out-of-date"), and may register, for the determined affected user(s), that the previously created payload is "out-of-date". This has the advantage that the payload is not necessarily immediately recreated for all affected users, and is only recreated if needed, see e.g. FIG. 5E.

Figure 5E:
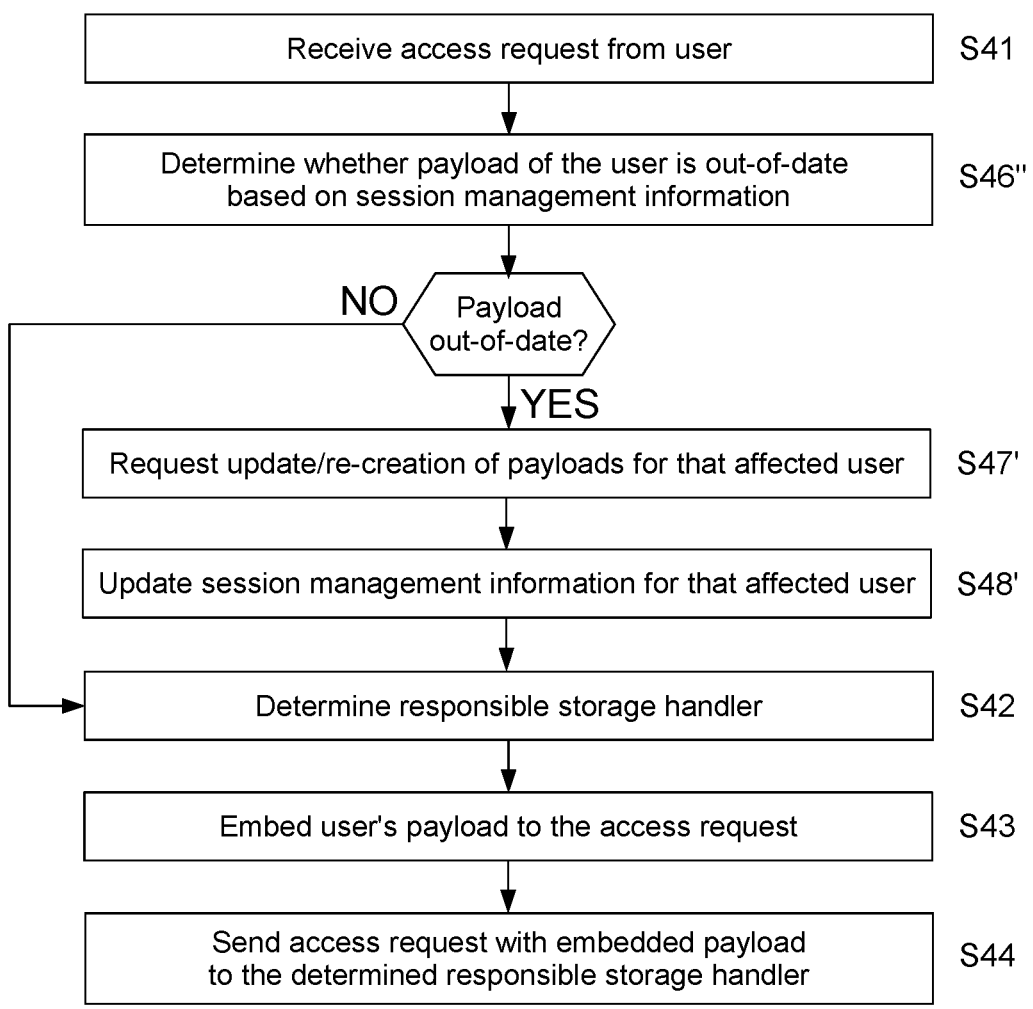
FIG. 5E exemplarily illustrates a flow chart of a process for UIC access request processing at the UIC according to some other exemplary embodiments.

FIG. 5E exemplarily illustrates a flow chart of a process for UIC access request processing at the UIC according to some other exemplary embodiments.

Exemplarily, in step S41, the user interface controller (UIC) may receive an access request to storage from a user, which has been previously authenticated and/or authorized based on the above, and/or for which a session has been initiated previously. The access request may be indicative of one or more data structures stored on one or more storage resources of the data storage system to be accessed (i.e. which data structures stored one storages resource is/are requested to be accessed by the received access request).

In step S46", the UIC determines, based on the session management information (which may have been updated in step S49 in FIG. 5D) stored for the user associated with the access request, whether the respective user was affected by any recent changes indicated in any notification messages, by checking whether the session management information indicates that the user's payload is out-of-date or not.

If step S46" returns NO, the process continues with steps S42, S43 and S44 similar to FIG. 5A or 5C above. However, if step S46" returns YES, the method continues with steps S47' and S48', similar to FIG. 5C.

In step S47', the UIC requests the authorization apparatus/module to update or recreate the payload for the respective affected user and, upon receiving the updated or newly created information at the UIC, the UIC updates the session management information for the respective affected user, accordingly, in step S48'.

That is, when a new access request is received from an affected user, the payload to be embedded in step S44 is the updated payload reflecting already the change of access control profile information for the affected user, although the change occurred during the ongoing session of that affected user. Then, the process continues with steps S43 and S44 similar to FIG. 5A or 5C above.

Exemplary Storage Handler Access Request Processing

Figure 6A:
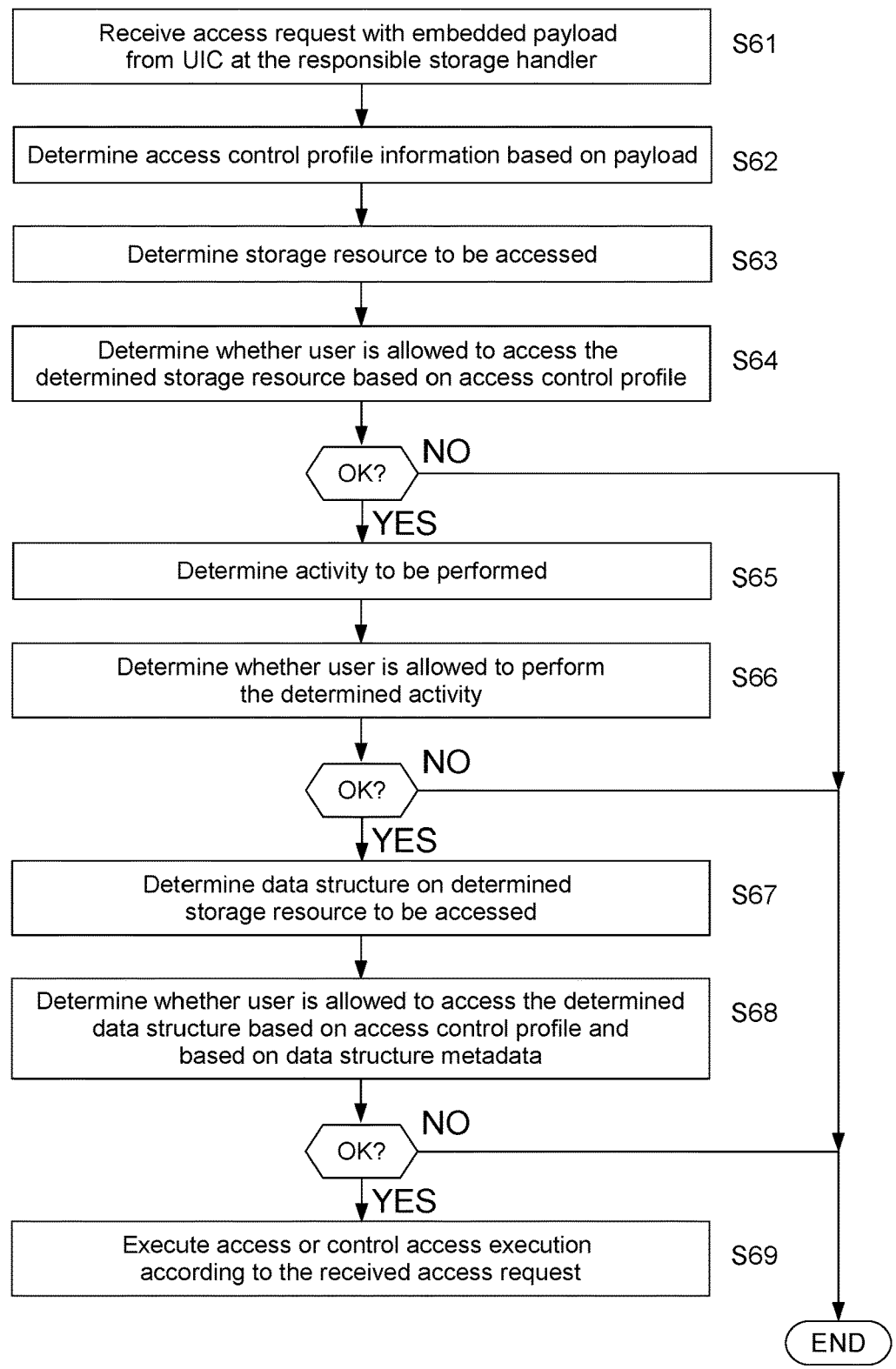
FIG. 6A exemplarily illustrates a flow chart of a process for storage handler access request processing at the storage handler according to some other exemplary embodiments.

FIG. 6A exemplarily illustrates a flow chart of a process for storage handler access request processing at the storage handler according to some other exemplary embodiments.

Exemplarily, in step S61, a storage handler (resource handling controller), such as a storage handler apparatus or storage handler module as described above, receives an access request of a user from the UIC with an embedded payload indicative of access control profile information associated with the certain user, e.g. as sent in a step S44 above.

In step S62, the storage handler (resource handling controller) exemplarily determines the access control profile information associated with the certain user associated with the received access request based on the payload embedded in the access request.

Furthermore, the storage handler (resource handling controller) may exemplarily perform decentralized access control (i.e. without further inquiries to the UIC), e.g. based on one or more of the further described steps S63 with S64, S65 with S66 and/or S67 with S68 (in arbitrary order).

Exemplarily, in step S63, the storage handler (resource handling controller) determines the one or more storage resources to be accessed based on the access request, and, in step S64, the storage handler (resource handling controller) determines whether the user associated with the access request is allowed/permitted to access the determined one or more storage resources to be accessed. If the step S64 returns NO, the access processing is stopped, refraining from executing the requested access request, and the process ends (e.g. by denial or error message send to the UIC).

For example, the storage handler (resource handling controller) may determine that the user associated with the access request is allowed/permitted to access the determined one or more storage resources if the determined one or more storage resources are included in a resource group indicated in the access control profile information associated with the respective user. Also, the storage handler (resource handling controller) may determine that the user associated with the access request is not allowed/permitted to access the determined one or more storage resources if the determined one or more storage resources are not included in any resource group indicated in the access control profile information associated with the respective user.

Exemplarily, in step S65, the storage handler (resource handling controller) determines the one or more activities to be performed based on the access request, and, in step S66, the storage handler (resource handling controller) determines whether the user associated with the access request is allowed/permitted to perform or request the determined one or more activities to be performed. If the step S66 returns NO, the access processing is stopped, refraining from executing the requested access request, and the process ends (e.g. by denial or error message send to the UIC).

For example, the storage handler (resource handling controller) may determine that the user associated with the access request is allowed/permitted to perform or request the determined one or more activities if the determined one or more activities are included in an activity group indicated in the access control profile information associated with the respective user or if the determined one or more activities are themselves indicated in the access control profile information associated with the respective user. Also, the storage handler (resource handling controller) may determine that the user associated with the access request is not allowed/permitted to perform or request the determined one or more activities if the determined one or more activities are not included in any activity group indicated in the access control profile information associated with the respective user and/or if the determined one or more activities are themselves not indicated in the access control profile information associated with the respective user.

Exemplarily, in step S67, the storage handler (resource handling controller) determines the one or more data structures on storage resources to be accessed based on the access request, and, in step S68, the storage handler (resource handling controller) determines whether the user associated with the access request is allowed/permitted to access the determined one or more data structures on storage resources to be accessed. If the step S68 returns NO, the access processing is stopped, refraining from executing the requested access request, and the process ends (e.g. by denial or error message send to the UIC).

For example, the storage handler (resource handling controller) may determine whether the user associated with the access request is allowed/permitted to access the determined one or more data structures based on the access level indicated in the access control profile information associated with the respective user, or based on the access level indicated for the resource group of a storage resource storing the respective one or more data structures in the access control profile information associated with the respective user.

Exemplarily, if the above access control processing has not lead to stop of access processing and refraining to access, e.g. if the steps S64, S66, and S68 have resulted in YES, the process continues with executing the requested access operation, e.g. by executing to access the requested one or more storage resources to perform the one or more requested activities on the one or more requested data structures.

FIG. 6B exemplarily illustrates a flow chart of a process for storage handler access request processing at the storage handler according to some other exemplary embodiments.

According to some exemplary embodiments, it may be important to determine altogether which activity the user can perform on the requested storage resource, since this may be affected by the user role (allowing one or more individual activities and/or one or more activities of one or more allowed activity groups) and the resource group(s) and the specified access level for that resource group. In other words, it is preferred that the system determines whether the user is allowed to perform the requested activity on the determined storage resource.

For example, a certain user may be allowed to perform an activity A1 on a storage node N1, and the same user may be allowed to perform an activity A2 on a storage node N2, however the user may not be allowed to perform activity A2 on storage node N1 and may also not be allowed to perform activity A1 on storage node N2. Accordingly, these determinations are exemplarily made in a same step S68' in the exemplary flow chart of FIG. 6B.

Furthermore, whether the user can access a certain data structure on a storage node may be determined based on the "access level" specified for the resource group to which the node belongs. The access level may be obtained from the access control profile information.

Exemplarily, in FIG. 6B and in step S61, a storage handler (resource handling controller), such as a storage handler apparatus or storage handler module as described above, receives an access request of a user from the UIC with an embedded payload indicative of access control profile information associated with the certain user, e.g. as sent in a step S44 above.

In step S62, the storage handler (resource handling controller) exemplarily determines the access control profile information associated with the certain user associated with the received access request based on the payload embedded in the access request.

Furthermore, the storage handler (resource handling controller) may exemplarily perform decentralized access control (i.e. without further inquiries to the UIC).

Exemplarily, in step S63, the storage handler (resource handling controller) determines the one or more storage resources to be accessed based on the access request.

Exemplarily, in step S65, the storage handler (resource handling controller) determines the one or more activities to be performed based on the access request.

Exemplarily, in step S67, the storage handler (resource handling controller) determines the one or more data structures on storage resources to be accessed based on the access request.

Then, in step S68', the storage handler (resource handling controller) determines whether the user associated with the access request is allowed/permitted to perform the determined activity of step S65 on the determined one or more data structures on storage resources to be accessed as determined in steps S63 and S65. As previously mentioned, the determination of step S68' depends on the access control profile(s) associated with the user, and step S68' is performed based on the allowed activities and/or allowed activity groups and the resource group as well as the access level for the resource group in the user's access control profile(s) information.

If the step S68' returns NO, the access processing is stopped, refraining from executing the requested access request, and the process ends (e.g. by denial or error message send to the UIC).

Exemplarily, if the above access control processing has not lead to stop of access processing and refraining to access, if the step S68' has resulted in YES, the process continues with executing the requested access operation, e.g. by executing to access the requested one or more storage resources to perform the one or more requested activities on the one or more requested data structures.

Exemplary Data Structures in Data Storage System

Figure 7:
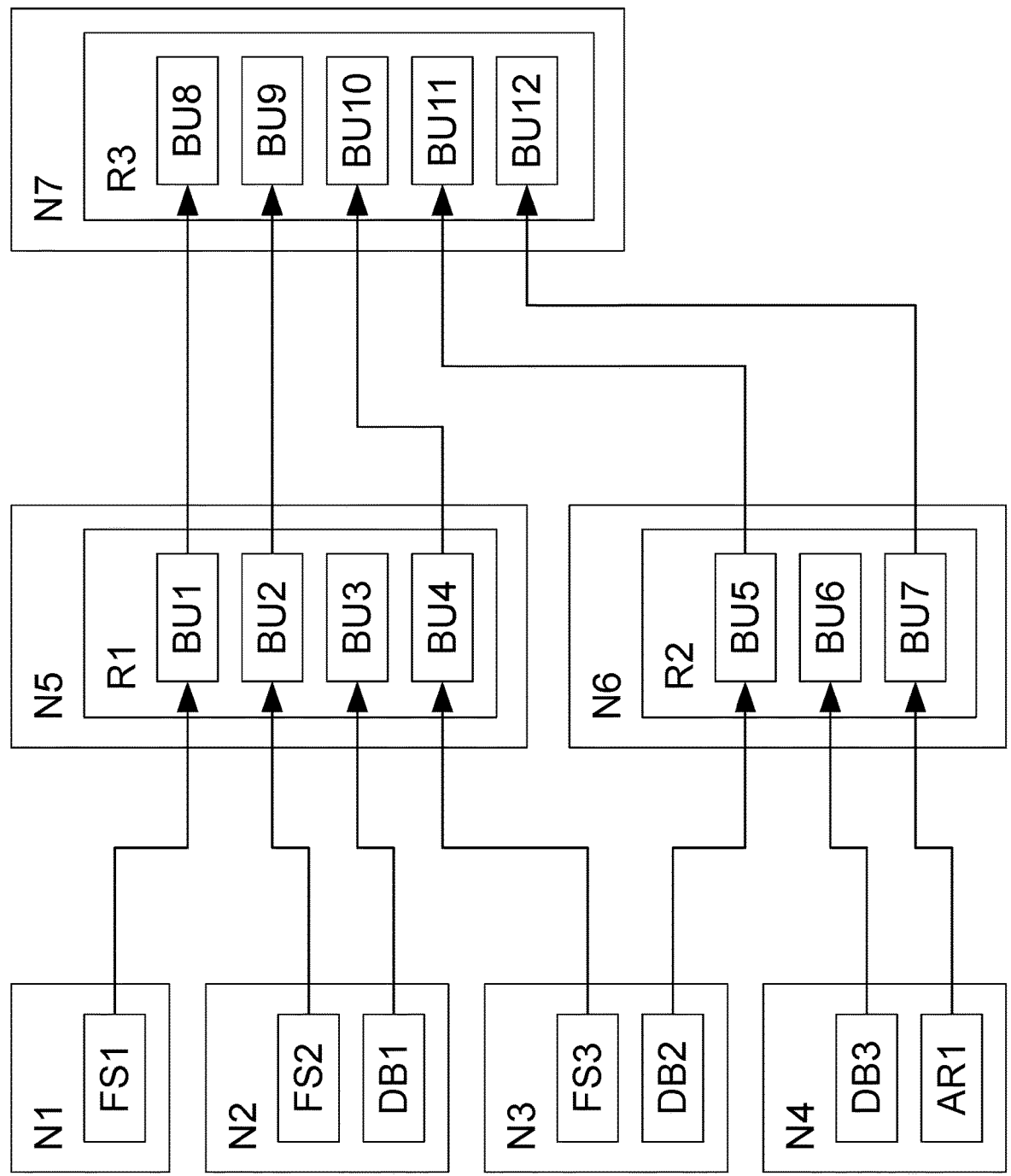
FIG. 7 exemplarily illustrates a distribution of data structures in an exemplary data storage system.

FIG. 7 exemplarily illustrates a distribution of data structures in an exemplary data storage system.

Exemplarily, the data storage system of FIG. 7 includes the nodes N1, N2, N3, N4, N5, N6 and N7. The nodes N1, N2, N3, N4, N5, N6 and N7 may be referred to as storage resources providing storage for one or more user accessible data structures.

In addition to physical or logical nodes representing storage resources, also logical storage entities on nodes or a cluster system of nodes may be referred to as a storage resource.

For example, in FIG. 7, the nodes N5, N6 and N7 respectively provide the logical repositories R1, R2 and R3 as storage resources for storing data structures.

A "data structure" may be any form of data structure of user-accessible data, such as a data structure may refer to a file, a group of files, a file system, a group of file systems, a database, a group of data bases, an archive, a group of archives a storage volume or a group of storage volumes, including logical volumes, virtual volumes, and data in a data structure may be stored by a file-based storage structure, a block-based storage structure or an object-based storage structure.

Such data structures as previously mentioned may be referred to as "primary data structures" in the sense that such "primary data structures" are added to the system manually by users, administrators or by applications and/or in the sense that such "primary data structures" are user-accessible (and/or application-accessible) to read and write or add data to the respective data structure based on application access and/or user access, in particular independent of another data structure.

On the other hand, another type of data structures referred to as "secondary data structure" may refer to data structures that may be dynamically and/or automatically created, and/or which may particularly be dependent on a "primary data structure" e.g. by partially or fully storying a copy of data of an associated "primary data structure". For example, if data of a "primary data structure" (and/or metadata of data of a "primary data structure") is copied partially or completely for data protection purposes, e.g. as a replication, a mirror copy, a backup, a snapshot, or the like, such partial or complete replication, mirror copy, backup, and/or snapshot of the "primary data structure" is referred to as the respective "secondary data structure" of the certain "primary data structure".

Such "secondary data structures" can be dynamically and/or automatically created by the system (e.g. by the storage handlers) by managing "secondary data structures" based on data protection policies, e.g. by defining source and destination nodes, source data, type of the source data (e.g. the type of the "primary data structure", such as a replication, a mirror copy, a backup, a snapshot, or the like), and operation policies such as when, at which interval of frequency or at which occurrence of an event a secondary data structure shall be created and/or updated.

Regarding "primary data structures", the data storage system of FIG. 7 exemplarily stores the file system FS1 on the node N1, the file system FS2 on node N2 and the file system FS3 on node N3. Also, exemplarily, the node N2 stores a database DB1, and the node N3 exemplarily stores a database DB2. The node N4 exemplarily stores a database DB3 and an archive AR1.

Regarding "secondary data structures", the data storage system of FIG. 7 exemplarily stores the backup data of the above-mentioned primary data structures, respectively.

For example, the node N5 provides the repository R1 which stores the backup BU1 of the file system FS1 of node N1 (as indicated by the arrow). This may relate to a mirror copy, or a snapshot of the file system, or it may also relate to partial copies of the file system such as backup copies of some of the files of the file system, or a backup copy of metadata thereof.

Similarly, the repository R1 exemplarily stores the backup BU2 of the file system FS2 of node N2 and a backup copy BU3 of the database DB1 of node N2. Further exemplarily, the repository R1 stores the backup BU4 of the file system FS3 of node N3.

Further, the node N6 provides the repository R2 which stores the backup BU5 of the database DB2 of node N3. This may relate to a mirror copy, remote replication copy, partial copy, or a copy or partial copy of metadata thereof, or the like.

Similarly, the repository R2 exemplarily stores the backup BU6 of the database DB3 of node N4. Further exemplarily, the repository R2 stores the backup BU7 of the archive of node N4. This may relate to a mirror copy, remote replication copy, partial copy, or a copy or partial copy of metadata thereof, or the like.

Furthermore, the node 7 provides the repository R3 which stores the backup BU8 of the backup BU1 in repository R1 (e.g. as a copy or partial copy thereof). The repository R3 further exemplarily stores the backup BU9 of the backup BU2 in repository R1, the backup BU10 of the backup BU4 in repository R1, the backup BU11 of the backup BU5 in repository R2, and the backup BU12 of the backup BU7 in repository R2.

Furthermore, a metadata section of the respective responsible storage handler and/or the respective secondary data structure stores data structure metadata which preferably indicates, for each secondary data structure, the respective parent and owner storage resources.

The "owner storage resource" of a respective secondary data structure is the storage resource that stores the corresponding associated "primary data structure".

Accordingly, in FIG. 7, exemplarily:
the owner storage resource of the backups BU1 and BU8 is, for both, the node N1 since it stores the associated primary data structure being the file system FS1,
the owner storage resource of the backups BU2 and BU9 is, for both, the node N2 since it stores the associated primary data structure being the file system FS2,
the owner storage resource of the backup BU3 is the node N2 since it stores the associated primary data structure being the database DB1,
the owner storage resource of the backups BU4 and BU10 is, for both, the node N3 since it stores the associated primary data structure being the file system FS3,
the owner storage resource of the backups BU5 and BU11 is, for both, the node N3 since it stores the associated primary data structure being the database DB2,
the owner storage resource of the backup BU6 is the node N4 since it stores the associated primary data structure being the database DB3, and
the owner storage resource of the backups BU7 and BU12 is, for both, the node N4 since it stores the associated primary data structure being the archive AR1.

On the other hand, the "parent storage resource" of a respective secondary data structure is the storage resource that stores the respective secondary data structure.

Accordingly, in FIG. 7, exemplarily:
the parent storage resource of the backups BU1 to BU4 is, for all of them, the repository R1 since it stores the respective backups BU1 to BU4,
the parent storage resource of the backups BU5 to BU7 is, for all of them, the repository R2 since it stores the respective backups BU5 to BU7, and
the parent storage resource of the backups BU8 to BU12 is, for all of them, the repository R3 since it stores the respective backups BU8 to BU412.

Accordingly, the following metadata may be stored for the respective backups in the metadata section of the respective responsible storage handler (resource handling controller) and/or with the respective secondary data structure:

For backup BU1 the respective data structure metadata may indicate the parent data storage resource R1 (repository R1, e.g. in the form of a storage resource ID) and the owner data storage resource N1 (node N1, e.g. in the form of a storage resource ID). The data structure metadata may further indicate a tenant associated with the respective parent and/or owner storage resource or the data structure, e.g. in the form of a tenant ID, to only allow access for users of the indicated tenant.

For backup BU2 the respective data structure metadata may indicate the parent data storage resource R1 (repository R1, e.g. in the form of a storage resource ID) and the owner data storage resource N2 (node N2, e.g. in the form of a storage resource ID). The data structure metadata may further indicate a tenant associated with the respective parent and/or owner storage resource or the data structure, e.g. in the form of a tenant ID, to only allow access for users of the indicated tenant.

For backup BU3 the respective data structure metadata may indicate the parent data storage resource R1 (repository R1, e.g. in the form of a storage resource ID) and the owner data storage resource N2 (node N2, e.g. in the form of a storage resource ID). The data structure metadata may further indicate a tenant associated with the respective parent and/or owner storage resource or the data structure, e.g. in the form of a tenant ID, to only allow access for users of the indicated tenant.

For backup BU4 the respective data structure metadata may indicate the parent data storage resource R1 (repository R1, e.g. in the form of a storage resource ID) and the owner data storage resource N3 (node N3, e.g. in the form of a storage resource ID). The data structure metadata may further indicate a tenant associated with the respective parent and/or owner storage resource or the data structure, e.g. in the form of a tenant ID, to only allow access for users of the indicated tenant.

For backup BU5 the respective data structure metadata may indicate the parent data storage resource R2 (repository R2, e.g. in the form of a storage resource ID) and the owner data storage resource N3 (node N3, e.g. in the form of a storage resource ID). The data structure metadata may further indicate a tenant associated with the respective parent and/or owner storage resource or the data structure, e.g. in the form of a tenant ID, to only allow access for users of the indicated tenant.

For backup BU6 the respective data structure metadata may indicate the parent data storage resource R2 (repository R2, e.g. in the form of a storage resource ID) and the owner data storage resource N4 (node N4, e.g. in the form of a storage resource ID). The data structure metadata may further indicate a tenant associated with the respective parent and/or owner storage resource or the data structure, e.g. in the form of a tenant ID, to only allow access for users of the indicated tenant.

For backup BU7 the respective data structure metadata may indicate the parent data storage resource R2 (repository R2, e.g. in the form of a storage resource ID) and the owner data storage resource N4 (node N4, e.g. in the form of a storage resource ID). The data structure metadata may further indicate a tenant associated with the respective parent and/or owner storage resource or the data structure, e.g. in the form of a tenant ID, to only allow access for users of the indicated tenant.

For backup BU8 the respective data structure metadata may indicate the parent data storage resource R3 (repository R3, e.g. in the form of a storage resource ID) and the owner data storage resource N1 (node N1, e.g. in the form of a storage resource ID). The data structure metadata may further indicate a tenant associated with the respective parent and/or owner storage resource or the data structure, e.g. in the form of a tenant ID, to only allow access for users of the indicated tenant.

For backup BU9 the respective data structure metadata may indicate the parent data storage resource R3 (repository R3, e.g. in the form of a storage resource ID) and the owner data storage resource N2 (node N2, e.g. in the form of a storage resource ID). The data structure metadata may further indicate a tenant associated with the respective parent and/or owner storage resource or the data structure, e.g. in the form of a tenant ID, to only allow access for users of the indicated tenant.

For backup BU10 the respective data structure metadata may indicate the parent data storage resource R3 (repository R3, e.g. in the form of a storage resource ID) and the owner data storage resource N3 (node N3, e.g. in the form of a storage resource ID). The data structure metadata may further indicate a tenant associated with the respective parent and/or owner storage resource or the data structure, e.g. in the form of a tenant ID, to only allow access for users of the indicated tenant.

For backup BU11 the respective data structure metadata may indicate the parent data storage resource R3 (repository R3, e.g. in the form of a storage resource ID) and the owner data storage resource N3 (node N3, e.g. in the form of a storage resource ID). The data structure metadata may further indicate a tenant associated with the respective parent and/or owner storage resource or the data structure, e.g. in the form of a tenant ID, to only allow access for users of the indicated tenant.

For backup BU12 the respective data structure metadata may indicate the parent data storage resource R3 (repository R3, e.g. in the form of a storage resource ID) and the owner data storage resource N4 (node N4, e.g. in the form of a storage resource ID). The data structure metadata may further indicate a tenant associated with the respective parent and/or owner storage resource or the data structure, e.g. in the form of a tenant ID, to only allow access for users of the indicated tenant.

On the other hand, for primary data structures, the respective data structure metadata may indicate the storage resource storing the respective data structure. The data structure metadata may further indicate a tenant associated with the respective storage resource or the data structure, e.g. in the form of a tenant ID, to only allow access for users of the indicated tenant.

When a tenant is further indicated in the data structure metadata, users can only be given access to a certain storage resource (or data structures on a certain storage resource), if the tenant of the user matches the tenant (e.g. tenant ID) indicated in the data structure metadata.

Example Resource Groups

As an example, for the data storage system of FIG. 7, the following resource groups may be exemplarily defined:
resource group RG1={N1, N2, N5, R1},
resource group RG2={N2, N3, N5, R1, N7, R3},
resource group RG3={N3, N4, N6, R2, N7, R3}, and
resource group RG4={N2, N7, R3}.

For primary data structures, a resource group indicated in a user's access control profile may indicate those storage resources for which the user can access the primary data structures thereon.

For example, a user being associated with an access control profile being associated with resource group RG1 can access the primary data structures on those resources of the resource group RG1, i.e. exemplarily the file system FS1 on node N1 and the file system FS2 on node N2 as well as the database DB1 on node N2 since nodes N1 and N2 are included in the respective resource node N1.

Accordingly, a user being associated with an access control profile being associated with resource group RG1 may be rejected to access any of the primary data structures FS3, DB2, DB3, and AR1 on nodes N1 and N4.

Exemplary Access Levels

As previously discussed, the access control profile information may preferably indicate, preferably for each resource group indicated in or associated with the respective access control profile, a certain access level according to which access level storage resources and particularly secondary data structures on such storage resources can be accessed by the respective user. Accordingly, preferably each resource group in the access control profile is given an access level.

For example, the following access levels can be provided:

- a first access level (GROUP access level, may also be referred to as LIMITED access level) which indicates that a user of the respective user account being associated with the first access level for a certain resource group is allowed to access, on a respective parent data storage resource, the secondary data structures for which the respective owner data storage resources are included in the certain resource group for which user access by the user associated with the respective user account is permitted according to the access control information. In other words, when the first access level is specified for a certain resource group in an access control profile associated with the user, the user is enabled to access secondary data structures that came from the storage resources in that same certain resource group (For example, with the first access level to a resource group RG1 in FIG. 7, a user would be able to see BU1, BU2 and BU3 (as they came from N1 and N2) but the user would not see BU4).
- a second access level (OWNER access level, may also be referred to as PERSONAL access level) which indicates that a user of the respective user account being associated with the second access level for a certain resource group is allowed to access, on a respective parent data storage resource, the secondary data structures associated with owner data storage resources provided by a node to which the user is currently logged in, in particular under the condition that the respective associated owner data storage resource is included in the certain resource group for which user access by the user associated with the respective user account is permitted according to the access control information. In other words, when the second access level is specified for a certain resource group in an access control profile associated with the user, the user is enabled to access secondary data structures that came from the storage resource to which the user is logged into (For example, with the second access level to a resource group RG1 in FIG. 7, a user logged in at node N1 would be able to see BU1, but would not see BU2, BU3 and BU4, however if the same user would log in at node N2 then they would be able to see BU2 and BU3, but not BU1 and BU4); and
- a third access level (FULL access level) which indicates that a user of the respective user account being associated with the third access level is allowed to access, on a respective parent data storage resource, the secondary data structures stored on the respective parent data storage resource independent of whether the respective associated owner data storage resources are included in a resource group for which user access by the user associated with the respective user account is permitted according to the access control information. In other words, when the third access level is specified for a certain resource group in an access control profile associated with the user, the user is enabled to access all secondary data structures on any storage resources in the certain resource group (For example, with the third access level to a resource group RG1 in FIG. 7, a user would be able to see all data structures on R1 (BU1, BU2, BU3 and BU4) as FULL access was granted to R1).

For example, a user logged in via node N1, being allowed to access the files system FS1 thereon, and being associated with an access control profile being associated with resource group RG1={N1, N2, N5, R1} and the third (FULL) access level can access all secondary data structures on repository R1 including BU1, BU2, BU3 and specifically including BU4, although the backup BU4 is a backup copy of a primary data structure (FS3) on a node (node N3) which is not included in the user's associated resource group RG1.

However, that user still cannot access any secondary data structures on repositories R2 and R3, despite the third access level "FULL", because those repositories R2 and R3 are not included in resource group RG1, and any access request would be rejected based on the access control.

Further exemplarily, a user logged in via node N1 and being associated with an access control profile being associated with resource group RG1={N1, N2, N5, R1} and the first (GROUP or LIMITED) access level can access only the secondary data structures BU1, BU2, BU3 on repository R1, because the owner storage resources thereof are provided on storage resources (nodes N1 and N2) which are included in the user's resource group RG1.

However, since the owner storage resource (node N3) of backup BU4 is not included in the user's resource group RG1, the respective user cannot access backup BU4 although the parent storage resource thereof (repository R1) is included in the user's resource group RG1. Furthermore, that user cannot access any secondary data structures on repositories R2 and R3, because those repositories R2 and R3 are not included in resource group RG1, and any access request would be rejected based on the access control.

Further exemplarily, a user logged in via node N1 and being associated with an access control profile being associated with resource group RG1={N1, N2, N5, R1} and the second (OWNER or PERSONAL) access level can access only the secondary data structure BU1 on repository R1, because the user is currently logged onto the owner storage resource (node N1) thereof.

However, although node 2 as storage resource storing the data structures FS2 and DB1, as owner storage resource of the backups BU2 and BU3, and the parent storage resource (repository R1) of the backups BU2 and BU3 are all included in the user's resource group RG1, and the parent, the user still cannot access those backups BU2 and BU3 on repository R1 since the user is currently not logged into the node N2 which is the owner storage resource of the backups BU2 and BU3.

Moreover, since the owner storage resource (node N3) of backup BU4 is not included in the user's resource group RG1, the respective user cannot access backup BU4 although the parent storage resource thereof (repository R1) is included in the user's resource group RG1. Furthermore, that user cannot access any secondary data structures on repositories R2 and R3, because those repositories R2 and R3 are not included in resource group RG1, and any access request would be rejected based on the access control.

Further exemplarily, independent of the access level, a user having an access control profile associated with resource group RG2={N2, N3, N5, R1, N7, R3} cannot access any of the primary data structures on nodes N1 and N4 since these are not included in the resource group RG2. Also, the user cannot access any of the secondary data structures on node N6 and repository R2 since these are not included in the resource group RG2.

However, the user can access the primary data structures on nodes N2 and N3 included in the resource group RG2.

Depending on the access level, the user may access certain secondary data structures on repositories R1 and R3 since nodes N5 and N7 and repositories R1 and R3 are included in the resource group RG2.

Specifically, under the access level "FULL" (third access level), the user can access all secondary data structures on repositories R1 and R3.

However, under the access level "GROUP" (first access level), the user cannot access the data structures of backup BU1 on repository R1 (since its owner storage resource being node N1 is not included in the resource group RG2), backup BU8 on repository R3 (since its owner storage resource being node N1 is not included in the resource group RG2), and backup BU12 on repository R3 (since its owner storage resource being node N4 is not included in the resource group RG2).

When the user associated with resource group RG2 is logged into node N2 under the access level "OWNER" (second access level), the user can access only backups BU2, BU3, and BU9 on repositories R1 and R3 since these are the secondary data structures having the node N2, through which the user is logged in, as owner storage resource.

Further exemplarily, independent of the access level, a user having an access control profile associated with resource group RG3={N3, N4, N6, R2, N7, R3} cannot access any of the primary data structures on nodes N1 and N2 since these are not included in the resource group RG3. Also, the user cannot access any of the secondary data structures on node N5 and repository R1 since these are not included in the resource group RG3.

However, the user can access the primary data structures on nodes N3 and N4 included in the resource group RG3. Depending on the access level, the user may access certain secondary data structures on repositories R2 and R3 since nodes N6 and N7 and repositories R2 and R3 are included in the resource group RG3.

Specifically, under the access level "FULL" (third access level), the user can access all secondary data structures on repositories R2 and R3.

However, under the access level "GROUP" (first access level), the user cannot access the data structures of backup BU8 on repository R3 (since its owner storage resource being node N1 is not included in the resource group RG3) and backup BU9 on repository R3 (since its owner storage resource being node N2 is not included in the resource group RG3).

When the user associated with resource group RG3 is logged into node N3 under the access level "OWNER" (second access level), the user can access only backups BU5, BU10, and BU11 on repositories R2 and R3 since these are the secondary data structures having the node N3, through which the user is logged in, as owner storage resource.

Further exemplarily, independent of the access level, a user having an access control profile associated with resource group RG4={N2, N7, R3} cannot access any of the primary data structures on nodes N1, N3 and N4 since these are not included in the resource group RG4. Also, the user cannot access any of the secondary data structures on node N5 and repository R1 and node N6 and repository R2 since these are not included in the resource group RG4.

However, the user can access the primary data structures on node N2 included in the resource group RG4. Depending on the access level, the user may access certain secondary data structures on repository R3 since node N7 and repository R3 are included in the resource group RG4.

Specifically, under the access level "FULL" (third access level), the user can access all secondary data structures on repository R3.

However, under the access level "GROUP" (first access level) or also under the access level "OWNER" (second access level) when logging in via the node N2 being the only node of primary data structures included in the user's resource group RG4, the user can only access the data structure of backup BU9 on repository R3 since this is the only secondary data structure on repository R3 having an owner storage resource included in the resource group RG4.

Further exemplarily, under the access level "OWNER" (second access level), if the user logs in at a storage node which is not within any of the resource groups, to which the user has access to, then that user will not see any secondary data structures on storage resources. For example, if a user with the second access level for the resource group RG1 in FIG. 7 would be logged in at storage node N4, that user would not see any secondary data structures in R1.

In view of the above, in exemplary embodiments, efficient and reliable as well as very flexible access control schemes for access control to primary and secondary data structures can be provided, e.g. on the basis of access control profiles indicative of one or more resource groups and/or indicative of different access levels for access to secondary data structures being created based on primary data structures. Also, those access control schemes can be reliably and efficiently be combined with role based access control (RBAC) and activity permissions, e.g. on the basis of activity groups and/or activities being associated with access control profiles. Such aspects can be further defined together with tenant discrimination schemes to allow access for users to data storage resources on the basis of tenants.

Moreover, in exemplary embodiments, e.g. by implementing or embedding a payload indicative of an access control profile of a user to the access requests of the user and/or by keeping metadata on data structures in the management of endpoint controllers such as the above exemplary storage handlers or resource handling controllers, it is advantageously possible to provide a decentralized access control scheme in a distributed system, which reduces the required communication bandwidth and processing burden at a central authorization module/apparatus or user interface management apparatus/module such as the exemplary UIC (user interface controller) in some exemplary embodiments thereof.

As will be appreciated by one of skill in the art, the present invention, as described hereinabove and the accompanying figures, may be embodied as a method (e.g., a computer-implemented process, a business process, or any other process), apparatus (including a device, machine, system, computer program product, and/or any other apparatus), or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments of the invention described herein may be combined to form other embodiments of the invention.

The invention claimed is:

1. A method for controlling user access to a data storage system including one or more nodes providing a plurality of data storage resources,
   the plurality of data storage resources storing one or more user-accessible primary data structures and one or more user-accessible secondary data structures, each secondary data structure being stored on the basis of a respective associated primary data structure,
   wherein the data storage system stores, for each secondary data structure, data structure metadata which is indicative of a parent data storage resource and an owner data storage resource of the respective secondary data structure, the parent data storage resource of the respective secondary data structure being the data storage resource which stores the respective secondary data structure and the owner data storage resource of the respective secondary data structure being the data storage resource which stores the respective associated primary data structure of the respective secondary data structure, and wherein the data storage system further stores access control information being, for each of one or more user accounts, indicative of at least one resource group of one or more data storage resources for which user access by the user associated with the respective user account is permitted;

the method including:
  receiving a user request to access a certain secondary data structure of the one or more secondary data structures stored on a respective parent data storage resource,
  determining, based on data structure metadata stored for the certain secondary data structure, the respective owner data storage resource of the certain secondary data structure, and
  determining whether the user of the user account associated with the user request is allowed to access the certain secondary data structure based on an access control verification process which includes a determination whether the determined owner data storage resource of the certain secondary data structure is permitted to be accessed by the user of the user account associated with the user request based on the access control information, wherein the access control information is, for each of the one or more user accounts, further indicative of at least three access levels including:
  a first access level of the one or more access levels indicates that a user of the respective user account being associated with the first access level is allowed to access, on a respective parent data storage resource, one or more secondary data structures for which the respective owner data storage resources are included in a resource group for which user access by the user associated with the respective user account is permitted according to the access control information,
  a second access level of the one or more access levels indicates that a user of the respective user account being associated with the second access level is allowed to access, on a respective parent data storage resource, one or more secondary data structures associated with one or more owner data storage resources provided by a node to which the user is currently logged in, in particular under the condition that the respective associated owner data storage resource is included in a resource group for which user access by the user associated with the respective user account is permitted according to the access control information, and
  a third access level of the one or more access levels indicates that a user of the respective user account being associated with the third access level is allowed to access, on a respective parent data storage resource, the one or more secondary data structures stored on the respective parent data storage resource independent of whether the one or more respective associated owner data storage resources are included in a resource group for which user access by the user associated with the respective user account is permitted according to the access control information.

2. The method according to claim 1, wherein
the data storage system further comprises a user interface controller configured to receive user requests,
the method further comprising:
  performing, upon session start when the user of the user account associated with the user request initiates a communication connection to the user interface controller, an authorization process which obtains, based on the access control information, a user access control profile indicative of at least one resource group of one or more data storage resources for which user access by the user associated with the respective user account is permitted.

3. The method according to claim 2, further comprising:
creating a payload indicative of the user access control profile of the user associated with the respective user account,
the method further comprising:
including, upon receiving the user request to access the certain secondary data structure at the user interface controller, the created payload within the user request of the user associated with the respective user account.

4. The method according to claim 3, wherein
the data storage system further comprises one or more resource handling controllers, each resource handling controller being configured to manage user access to one or more data storage resources of the data storage system,
the method further comprising:
  sending, from the user interface controller, the user request including the created payload to the resource handling controller managing access to the parent data storage resource of the certain secondary data structure.

5. The method according to claim 4, wherein
each resource handling controller is further configured to manage the data structure metadata relating to the secondary data structures stored on the one or more data storage resources managed by the respective resource handling controller,
the method further comprising:
  receiving, at the resource handling controller managing access to the parent data storage resource of the certain secondary data structure, the user request including the created payload,
wherein determining the respective owner data storage resource of the certain secondary data structure and determining whether the user of the user account associated with the user request is allowed to access the certain secondary data structure is performed by the resource handling controller managing access to the parent data storage resource of the certain secondary data structure based on the data structure metadata managed by the respective resource handling controller and the payload included in the received user request.

6. The method according to claim 1, wherein
determining whether the user of the user account associated with the user request is allowed to access the certain secondary data structure is further based on a determination whether the parent data storage resource of the certain secondary data structure is permitted to be accessed by the user of the user account associated with the user request based on the access control information.

7. The method according to claim 6, wherein
the user of the user account associated with the user request is determined to be allowed to access the certain secondary data structure under the condition that the respective parent data storage resource of the certain secondary data structure is included in a resource group for which user access by the user associated with the respective user account is permitted according to the access control information.

8. The method according to claim 1, wherein
the access control information is, for each of the one or more user accounts, further indicative of at least one permissible user activity or at least one activity group including at least one permissible user activity allowed to be performed, by the user associated with the respective user account, on data storage resources of the resource group for which user access by the user associated with the respective user account is permitted.

9. The method according to claim 8, wherein
determining whether the user of the user account associated with the user request is allowed to access the certain secondary data structure is further based on a determination whether a respective user activity requested by the user request is permitted to be performed by the user of the user account associated with the user request based on the access control information.

10. The method according to claim 1, wherein
the access control information includes RBAC (role based access control) information which is, for each of the one or more user accounts, further indicative of a user role of the respective user associated with the respective user account,
each user role is associated with at least one permissible user activity or at least one activity group including at least one permissible user activity, and
the user access control profile is further indicative of the user role associated with the user associated with the respective user account, and the created payload is further indicative of the user role associated with the user associated with the respective user account.

11. The method according to claim 10, wherein
the created payload is further indicative of the at least one permissible user activity or at least one activity group including at least one permissible user activity associated with the respective user role associated with the user associated with the respective user account.

12. The method according to claim 10 being dependent on claim 4, wherein
each resource handling controller is further configured to manage activity metadata which is, for each of one or more user roles, indicative of the at least one permissible user activity or at least one activity group including at least one permissible user activity associated with the respective user role, and
determining whether the user of the user account associated with the user request is allowed to access the certain secondary data structure is further based on a determination whether a respective user activity requested by the user request is permitted to be performed by the user of the user account associated with the user request based on the activity metadata managed by the respective resource handling controller and the payload included in the received user request.

13. A data storage system including one or more nodes providing a plurality of data storage resources,
the plurality of data storage resources being configured to store one or more user-accessible primary data structures and one or more user-accessible secondary data structures, each secondary data structure being stored on the basis of a respective associated primary data structure,
wherein the data storage system is configured to store, for each secondary data structure, data structure metadata which is indicative of a parent data storage resource and an owner data storage resource of the respective secondary data structure,
the parent data storage resource of the respective secondary data structure being the data storage resource which stores the respective secondary data structure and the owner data storage resource of the respective secondary data structure being the data storage resource which stores the respective associated primary data structure of the respective secondary data structure, and
wherein the data storage system is further configured to store access control information being, for each of one or more user accounts, indicative of at least one resource group of one or more data storage resources for which user access by the user associated with the respective user account is permitted;
the data storage system, or one or more nodes of the data storage system, being configured, upon receiving a user request to access a certain secondary data structure of the one or more secondary data structures stored on a respective parent data storage resource, to execute:
determining, based on data structure metadata stored for the certain secondary data structure, the respective owner data storage resource of the certain secondary data structure, and
determining whether the user of the user account associated with the user request is allowed to access the certain secondary data structure based on an access control verification process which includes a determination whether the determined owner data storage resource of the certain secondary data structure is permitted to be accessed by the user of the user account associated with the user request based on the access control information,
wherein the access control information is, for each of the one or more user accounts, further indicative of at least three access levels including:
a first access level of the one or more access levels indicates that a user of the respective user account being associated with the first access level is allowed to access, on a respective parent data storage resource, one or more secondary data structures for which the respective owner data storage resources are included in a resource group for which user access by the user associated with the respective user account is permitted according to the access control information,
a second access level of the one or more access levels indicates that a user of the respective user account being associated with the second access level is allowed to access, on a respective parent data storage resource, one or more secondary data structures associated with one or more owner data storage resources provided by a node to which the user is currently logged in, in particular under the condition that the respective associated owner data storage resource is included in a resource group for which user access by the user associated with the respective user account is permitted according to the access control information, and a third access level of the one or more access levels indicates that a user of the respective user account being associated with the third access level is allowed to access, on a respective parent data storage resource, the one or more secondary data structures stored on the respective parent data storage resource independent of whether the one or more respective associated owner data storage resources are included in a resource group for which user access by the user associated with the respective user account is permitted according to the access control information.

14. A non-transitory computer readable storage medium for controlling user access to a data storage system including one or more nodes providing a plurality of data storage resources, the plurality of data storage resources storing one or more user-accessible primary data structures and one or more user-accessible secondary data structures, each secondary data structure being stored on the basis of a respective associated primary data structure, wherein the data storage system stores, for each secondary data structure, data structure metadata which is indicative of a parent data storage resource and an owner data storage resource of the respective secondary data structure, the parent data storage resource of the respective secondary data structure being the data storage resource which stores the respective secondary data structure and the owner data storage resource of the respective secondary data structure being the data storage resource which stores the respective associated primary data structure of the respective secondary data structure, and wherein the data storage system further stores access control information being, for each of one or more user accounts, indicative of at least one resource group of one or more data storage resources for which user access by the user associated with the respective user account is permitted;

the non-transitory computer readable storage medium storing thereon a computer program comprising computer-readable program instructions which, when running on or loaded into an apparatus or system having at least one processor, cause the at least one processor, upon receiving a user request to access a certain secondary data structure of the one or more secondary data structures stored on a respective parent data storage resource, to execute:

determining, based on data structure metadata stored for the certain secondary data structure, the respective owner data storage resource of the certain secondary data structure, and determining whether the user of the user account associated with the user request is allowed to access the certain secondary data structure based on an access control verification process which includes a determination whether the determined owner data storage resource of the certain secondary data structure is permitted to be accessed by the user of the user account associated with the user request based on the access control information, wherein the access control information is, for each of the one or more user accounts, further indicative of at least three access levels including:

a first access level of the one or more access levels indicates that a user of the respective user account being associated with the first access level is allowed to access, on a respective parent data storage resource, one or more secondary data structures for which the respective owner data storage resources are included in a resource group for which user access by the user associated with the respective user account is permitted according to the access control information, a second access level of the one or more access levels indicates that a user of the respective user account being associated with the second access level is allowed to access, on a respective parent data storage resource, one or more secondary data structures associated with one or more owner data storage resources provided by a node to which the user is currently logged in, in particular under the condition that the respective associated owner data storage resource is included in a resource group for which user access by the user associated with the respective user account is permitted according to the access control information, and a third access level of the one or more access levels indicates that a user of the respective user account being associated with the third access level is allowed to access, on a respective parent data storage resource, the one or more secondary data structures stored on the respective parent data storage resource independent of whether the one or more respective associated owner data storage resources are included in a resource group for which user access by the user associated with the respective user account is permitted according to the access control information.

* * * * *